US012335539B2

(12) United States Patent
Dumas et al.

(10) Patent No.: US 12,335,539 B2
(45) Date of Patent: Jun. 17, 2025

(54) NEURAL NETWORK-BASED INTRA PREDICTION FOR VIDEO ENCODING OR DECODING

(71) Applicant: INTERDIGITAL MADISON PATENT HOLDINGS, SAS, Paris (FR)

(72) Inventors: Thierry Dumas, Rennes (FR); Franck Galpin, Thorigne-Fouillard (FR); Philippe Bordes, Laille (FR); Fabrice Leleannec, Betton (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 94 days.

(21) Appl. No.: 17/800,002

(22) PCT Filed: Jan. 29, 2021

(86) PCT No.: PCT/EP2021/052094
§ 371 (c)(1),
(2) Date: Aug. 16, 2022

(87) PCT Pub. No.: WO2021/165018
PCT Pub. Date: Aug. 26, 2021

(65) Prior Publication Data
US 2023/0095387 A1 Mar. 30, 2023

(30) Foreign Application Priority Data
Feb. 21, 2020 (EP) ..................................... 20305169

(51) Int. Cl.
*H04N 19/82* (2014.01)
*H04N 19/159* (2014.01)
(Continued)

(52) U.S. Cl.
CPC ........... *H04N 19/88* (2014.11); *H04N 19/159* (2014.11); *H04N 19/176* (2014.11); *H04N 19/46* (2014.11)

(58) Field of Classification Search
CPC .... H04N 19/88; H04N 19/159; H04N 19/176; H04N 19/46; H04N 19/82
See application file for complete search history.

(56) References Cited

U.S. PATENT DOCUMENTS

2018/0184123 A1* 6/2018 Terada .................... G06T 9/002
2018/0332282 A1 11/2018 He et al.
(Continued)

FOREIGN PATENT DOCUMENTS

WO WO 2019072921 A1 4/2019
WO WO-2019185808 A1 * 10/2019 ........... H04N 19/105
WO WO-2019185883 A1 * 10/2019 ............. H04N 19/12

OTHER PUBLICATIONS

Hu et al., "Progressive Spatial Recurrent Neural Network for Intra Prediction", Institute of Electronics and Electronical Engineers (IEEE), IEEE Transactions on MultiMedia, vol. 21, Issue: 12, Dec. 2019, 14 pages.

(Continued)

*Primary Examiner* — Patrick E Demosky
(74) *Attorney, Agent, or Firm* — Condo Roccia Koptiw LLP

(57) ABSTRACT

A video coding system is provided that performs intra prediction in a mode using a neural network for block of only a set of specific block sizes. The signaling of this mode is designed to be efficient in terms of rate-distortion under this constraint. Different transformations of the context of a block and the neural network prediction of this block are introduced in order to use one single neural network for predicting blocks of several sizes, as well as the corresponding signaling. The neural network-based prediction mode (Continued)

considers both luminance blocks and chrominance blocks. The video coding system comprises encoder and decoder apparatuses, encoding, decoding and signal generation methods and a signal carrying information corresponding to the described coding mode.

20 Claims, 21 Drawing Sheets

(51) Int. Cl.
  *H04N 19/176* (2014.01)
  *H04N 19/46* (2014.01)
  *H04N 19/88* (2014.01)

(56) References Cited

U.S. PATENT DOCUMENTS

| | | | |
|---|---|---|---|
| 2019/0387222 A1 | 12/2019 | Kim et al. | |
| 2020/0186796 A1* | 6/2020 | Mukherjee | H04N 19/107 |
| 2020/0304832 A1* | 9/2020 | Ramasubramonian | H04N 19/136 |
| 2022/0360785 A1* | 11/2022 | Huo | H04N 19/105 |

OTHER PUBLICATIONS

Li et al., "Fully-Connected Network-Based Intra Prediction for Image Coding", Institute of Electrical and Electronics Engineers (IEEE), IEEE Transactions on Image Processing, vol. 27, No. 7, Jul. 2018, 12 pages.

Dumas et al., "Context-adaptive neural network-based prediction for image compression", Institute of Electrical and Electronics Engineers (IEEE), IEEE Transactions on Image Processing, vol. 29, Aug. 16, 2019, 15 pages.

Bross et al., "Versatile Video Coding (Draft 8)", Joint Video Experts Team (JVET) of ITU-T SG 16 WP3 and ISO/IEC JTC 1/SC 29/WG 11, Document: JVET-Q2001-vD, 17th Meeting, Brussels, Belgium, Jan. 7, 2020, 511 pages.

Anonymous, "High Efficiency Video Coding", International Telecommunication Union, Telecommunication Standardization Sector of ITU, Series H: Audiovisual and Multimedia Systems—Infrastructure of audiovisual services—Coding of moving video, Recommendation of ITU-T H.265, Nov. 2019, 712 pages.

Dumas et al., "AHG11: Neural Network-based intra prediction with transform selection in VVC", Joint Video Experts Team (JVET) of ITU-T SG 16 WP 3 and ISO/IEC JTC 1/SC 29, Document: JVET-T0073, 20th Meeting, Oct. 7, 2020, teleconference, 11 pages.

Pfaff et al., "Neural Network based intra prediction for video coding", International Society for Optics and Photonics (SPIE), SPIE Proceedings, vol. 10752, Applications of Digital Image Processing XLI, 1075213, Sep. 17, 2018, 7 pages.

* cited by examiner $$X = X_0 \cup X_1$$

FIG. 26

| W x H | δ | ϒ | Signaling | Neural network |
|---|---|---|---|---|
| 4 x 4 | 1 | 1 | $\delta_0$ | $f_{4,4}(.\,;\boldsymbol{\theta}_{4,4})$ |
| 4 x 8 | 1 | 1 | $\delta_0$ | $f_{8,4}(.\,;\boldsymbol{\theta}_{8,4})$ |
| 8 x 4 | 1 | 1 | $\delta_0$ | $f_{4,8}(.\,;\boldsymbol{\theta}_{4,8})$ |
| 4 x 16 | 2 | 1 | $\delta_0$ | $f_{8,4}(.\,;\boldsymbol{\theta}_{8,4})$ |
| 16 x 4 | 1 | 2 | $\delta_0$ | $f_{4,8}(.\,;\boldsymbol{\theta}_{4,8})$ |
| 4 x 32 | | | $\delta_1$ | |
| 32 x 4 | | | $\delta_1$ | |
| 4 x 64 | | | $\delta_1$ | |
| 64 x 4 | | | $\delta_1$ | |
| 8 x 8 | 1 | 1 | $\delta_0$ | $f_{8,8}(.\,;\boldsymbol{\theta}_{8,8})$ |
| 8 x 16 | 2 | 1 | $\delta_0$ | $f_{8,8}(.\,;\boldsymbol{\theta}_{8,8})$ |
| 16 x 8 | 1 | 2 | $\delta_0$ | $f_{8,8}(.\,;\boldsymbol{\theta}_{8,8})$ |
| 8 x 32 | | | $\delta_1$ | |
| 32 x 8 | | | $\delta_1$ | |
| 8 x 64 | | | $\delta_1$ | |
| 64 x 8 | | | $\delta_1$ | |
| 16 x 16 | 1 | 1 | $\delta_0$ | $f_{16,16}(.\,;\boldsymbol{\theta}_{16,16})$ |
| 16 x 32 | 2 | 1 | $\delta_0$ | $f_{16,16}(.\,;\boldsymbol{\theta}_{16,16})$ |
| 32 x 16 | 1 | 2 | $\delta_0$ | $f_{16,16}(.\,;\boldsymbol{\theta}_{16,16})$ |
| 16 x 64 | | | $\delta_1$ | |
| 64 x 16 | | | $\delta_1$ | |
| 32 x 32 | 1 | 1 | $\delta_0$ | $f_{32,32}(.\,;\boldsymbol{\theta}_{32,32})$ |
| 32 x 64 | 2 | 1 | $\delta_0$ | $f_{32,32}(.\,;\boldsymbol{\theta}_{32,32})$ |
| 64 x 62 | 1 | 2 | $\delta_0$ | $f_{32,32}(.\,;\boldsymbol{\theta}_{32,32})$ |
| 64 x 64 | 2 | 2 | $\delta_0$ | $f_{32,32}(.\,;\boldsymbol{\theta}_{32,32})$ |

NEURAL NETWORK-BASED INTRA PREDICTION FOR VIDEO ENCODING OR DECODING

CROSS REFERENCE TO RELATED APPLICATIONS

This application is a U.S. National Stage Application under 35 U.S.C. 371 of International Patent Application No. PCT/EP2021/052094, filed Jan. 29, 2021, which is incorporated herein by reference in its entirety.

This application claims the benefit of European Application No. 20305169.3, filed Feb. 21, 2020.

TECHNICAL FIELD

At least one of the present embodiments generally relates to neural network based intra prediction for video encoding or decoding.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

One or more of the present embodiments provide a video coding system that performs intra prediction in a mode using a neural network for blocks of only a set of specific block sizes. The signaling of this mode is designed to be efficient in terms of rate-distortion under this constraint. Different transformations of the context of a block and the neural network prediction of this block are introduced in order to use one single neural network for predicting blocks of several sizes, as well as the corresponding signaling. The neural network-based prediction mode considers both luminance blocks and chrominance blocks. The video coding system comprises encoder and decoder apparatuses, encoding, decoding and signal generation methods and a signal carrying information corresponding to the described coding mode.

According to a first aspect of at least one embodiment, a video encoding method comprises performing intra prediction for at least one block in a picture or video using a neural network-based intra prediction mode based on a block context, said block context comprising a set of surrounding pixels located at the top side and the left side of the at least one block, generating signaling information representative of the neural network-based intra prediction mode, and encoding at least information representative of the at least one block and the neural network-based intra prediction mode.

According to a second aspect of at least one embodiment, a video decoding method comprises obtaining, for at least one block in a picture or video, at least information representative of the neural network-based prediction mode and a block context, said block context comprising a set of surrounding pixels located at the top side and the left side of the at least one block, and performing intra prediction for the at least one block in a picture or video using a neural network-based intra prediction mode based on the block context.

According to a third aspect of at least one embodiment, an apparatus, comprises an encoder for encoding picture data for at least one block in a picture or video wherein the encoder is configured to perform intra prediction for at least one block in a picture or video to using a neural network-based intra prediction mode based on a block context, said block context comprising a set of surrounding pixels located at the top side and the left side of the at least one block, generate signaling information representative of the neural network-based intra prediction mode, and encode at least information representative of the at least one block and the neural network-based intra prediction mode.

According to a fourth aspect of at least one embodiment, an apparatus, comprises a decoder for decoding picture data for at least one block in a picture or video wherein the decoder is configured to obtain, for at least one block in a picture or video, at least information representative of the neural network-based prediction mode and a block context, said block context comprising a set of surrounding pixels located at the top side and the left side of the at least one block, and perform intra prediction for the at least one block in a picture or video using a neural network-based intra prediction mode based on the block context.

According to variants of first, second, third and fourth embodiment, the set of surrounding blocks pixels of the block context comprise pixels of blocks located at the top side, at the left side, at the diagonal top left side, at the diagonal top right side and at the diagonal bottom left side of the current block and wherein the size of the blocks are based on the size of the at least one block According to a fifth aspect of at least one embodiment, a bitstream comprises information representative of the neural network-based prediction mode according to the method according to at least the first aspect.

According to a sixth aspect of at least one embodiment, a computer program comprising program code instructions executable by a processor is presented, the computer program implementing the steps of a method according to at least the first or second aspect.

According to a seventh aspect of at least one embodiment, a computer program product which is stored on a non-transitory computer readable medium and comprises program code instructions executable by a processor is presented, the computer program product implementing the steps of a method according to at least the first or second aspect.

BRIEF DESCRIPTION OF THE DRAWINGS

FIG. 26 illustrates an example of mapping from the size W×H of the current luminance PB to $\gamma$, $\delta$, the intra prediction mode signaling, and the neural network used for prediction.

DETAILED DESCRIPTION

Figure 1:
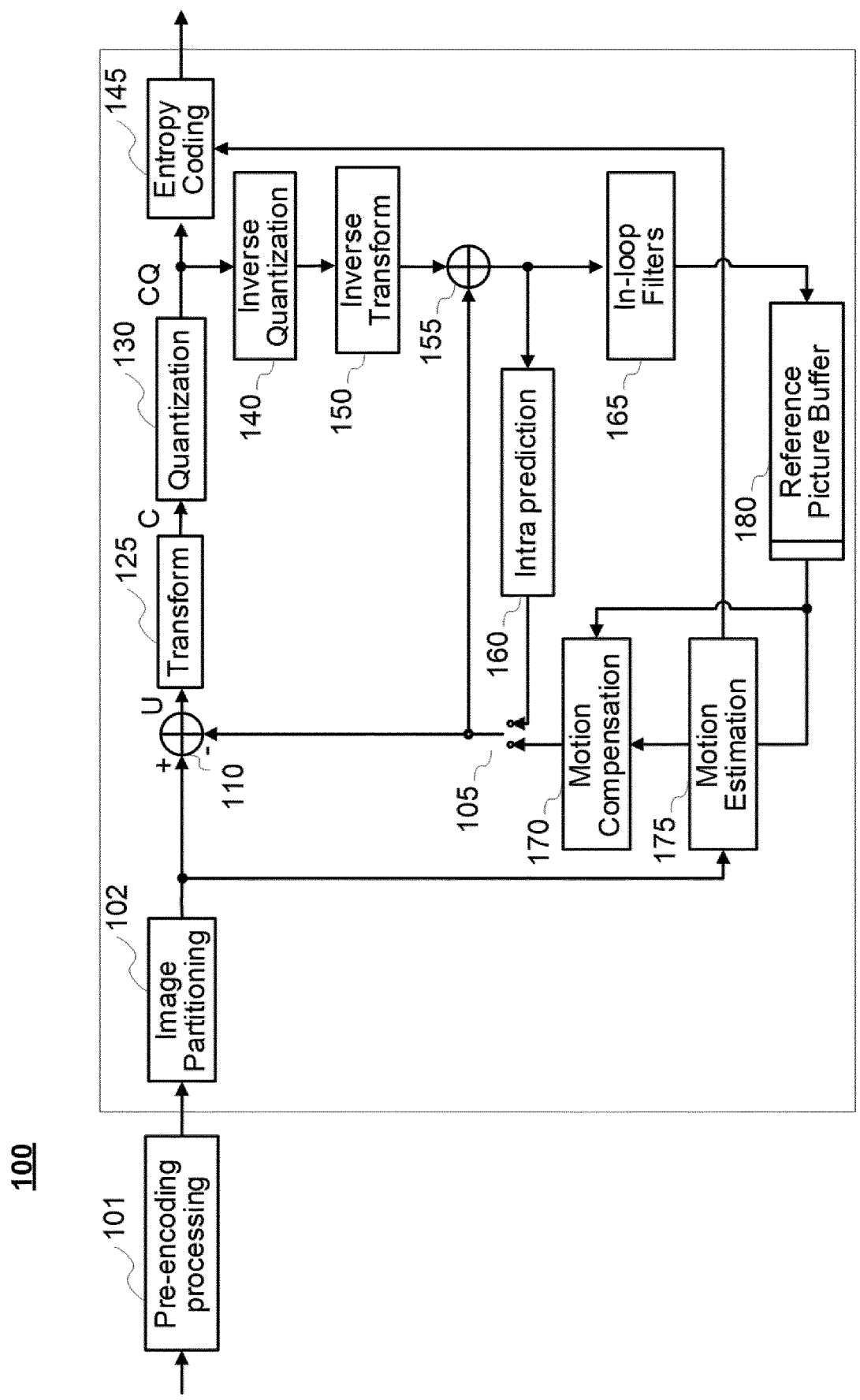
FIG. 1 illustrates a block diagram of an example of video encoder 100.

FIG. 1 illustrates block diagram of an example of video encoder 100. Examples of video encoders comprise a High Efficiency Video Coding (HEVC) encoder compliant with the HEVC standard, or a HEVC encoder in which improvements are made to the HEVC standard or an encoder employing technologies similar to HEVC, such as a JEM (Joint Exploration Model) encoder under development by JVET (Joint Video Exploration Team) for Versatile Video Coding (VVC) standardisation, or other encoders.

Before being encoded, the video sequence can go through pre-encoding processing (101). This is for example performed by applying a color transform to the input color picture (for example, conversion from RGB 4:4:4 to YCbCr 4:2:0) or performing a remapping of the input picture components in order to get a signal distribution more resilient to compression (for instance using a histogram equalization of one of the color components). Metadata can be associated with the pre-processing and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (for example, luma, Y), and the "unit" includes the collocated blocks of all encoded color components (Y, Cb, Cr, or monochrome), syntax elements, and prediction data that are associated with the blocks (for example, motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU.

In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes. Indeed, in other coding standards, such as the one under development by JVET, the block shapes can be different from square blocks (for example rectangular blocks), the maximal block size can be bigger and the arrangement of blocks can be different.

In the example of encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of three most probable modes (MPM), the mode is signaled by an index in the MPM list. Otherwise, the mode is signaled by a fixed-length binarization of the mode index. The three most probable modes are derived from the intra prediction modes of the top and left neighboring blocks.

For an inter CU, the corresponding coding block is further partitioned into one or more prediction blocks. Inter prediction is performed on the PB level, and the corresponding PU contains the information about how inter prediction is performed. The motion information (for example, motion vector and reference picture index) can be signaled in two methods, namely, "merge mode" and "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the PU syntax for AMVP.

The prediction residuals are then transformed (125) and quantized (130), including at least one embodiment for adapting the chroma quantization parameter described below. The transforms are generally based on separable transforms. For instance, a DCT transform is first applied in the horizontal direction, then in the vertical direction. In recent codecs such as the JEM, the transforms used in both directions may differ (for example, DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, that is, the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
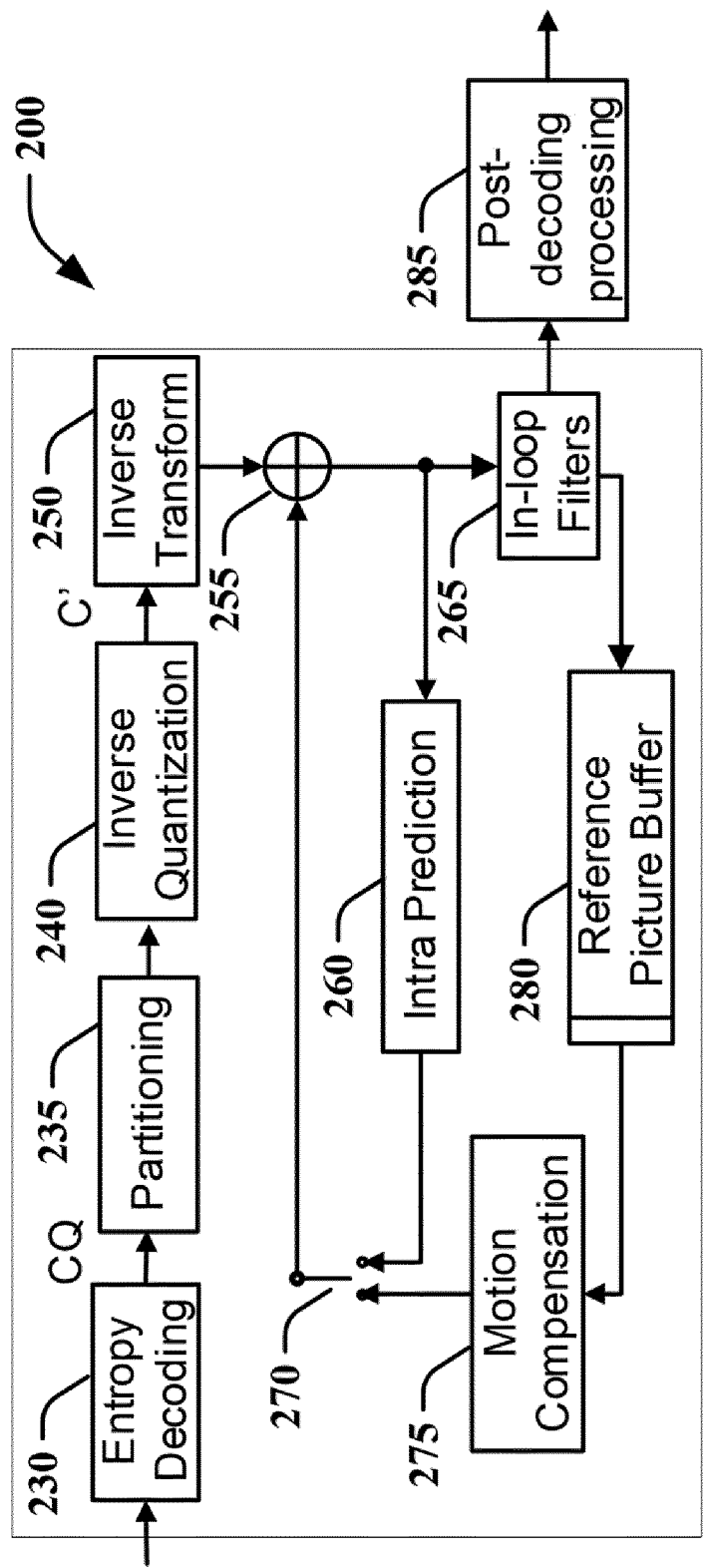
FIG. 2 illustrates a block diagram of an example of video decoder 200.

FIG. 2 illustrates a block diagram of an example of video decoder 200. Examples of video decoders comprise a High Efficiency Video Coding (HEVC) decoder compliant with the HEVC standard, or a HEVC decoder in which improvements are made to the HEVC standard or a decoder employing technologies similar to HEVC, such as a JEM (Joint Exploration Model) decoder under development by JVET (Joint Video Exploration Team) for Versatile Video Coding (VVC) standardisation, or other decoders.

In the example of decoder 200, a bitstream is decoded by the decoder elements as described below. Video decoder 200 generally performs a decoding pass reciprocal to the encoding pass as described in FIG. 1, which performs video decoding as part of encoding video data.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) including at least one embodiment for adapting the chroma quantization parameter described below and inverse transformed (250) to decode the prediction residuals.

Combining (255) the decoded prediction residuals and the predicted block, an image block is reconstructed. The predicted block may be obtained (270) from intra prediction (260) or motion-compensated prediction (that is, inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (for example conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
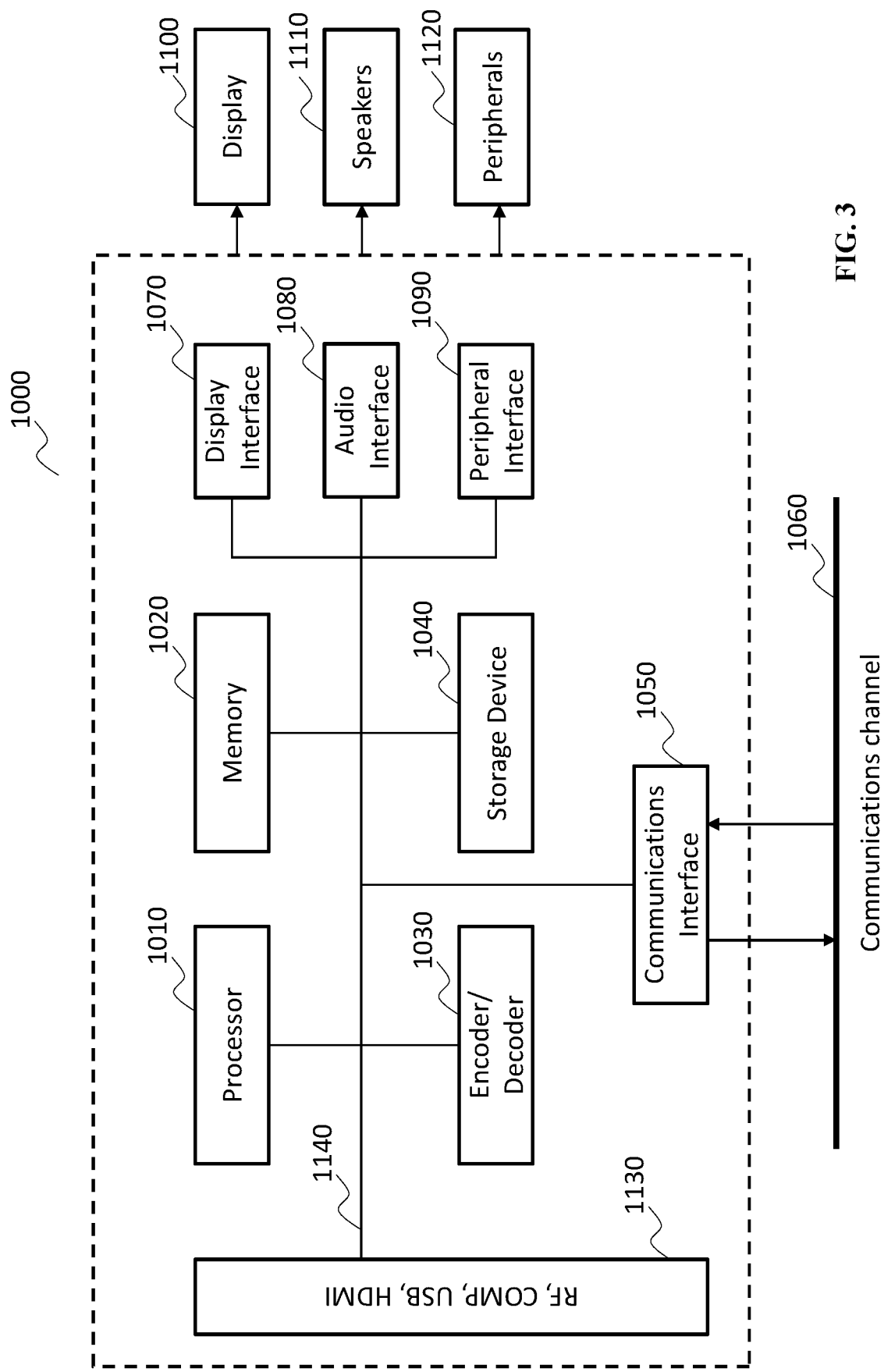
FIG. 3 illustrates a block diagram of an example of a system in which various aspects and embodiments are implemented.

FIG. 3 illustrates a block diagram of an example of a system in which various aspects and embodiments are implemented. System 1000 can be embodied as a device including the various components described below and is configured to perform one or more of the aspects described in this application. Examples of such devices include, but are not limited to, various electronic devices such as personal computers, laptop computers, smartphones, tablet computers, digital multimedia set top boxes, digital television receivers, personal video recording systems, connected home appliances, encoders, transcoders, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or anon-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the data stream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV .Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs. The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, as an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

The process of intra prediction (160, 260) comprises gathering reference samples, processing them, deriving from the processed reference samples a prediction of the samples of the current block, and post-processing the predicted samples. The intra prediction modes use data from neighboring prediction blocks that have been previously decoded from within the same picture.

Figure 4:
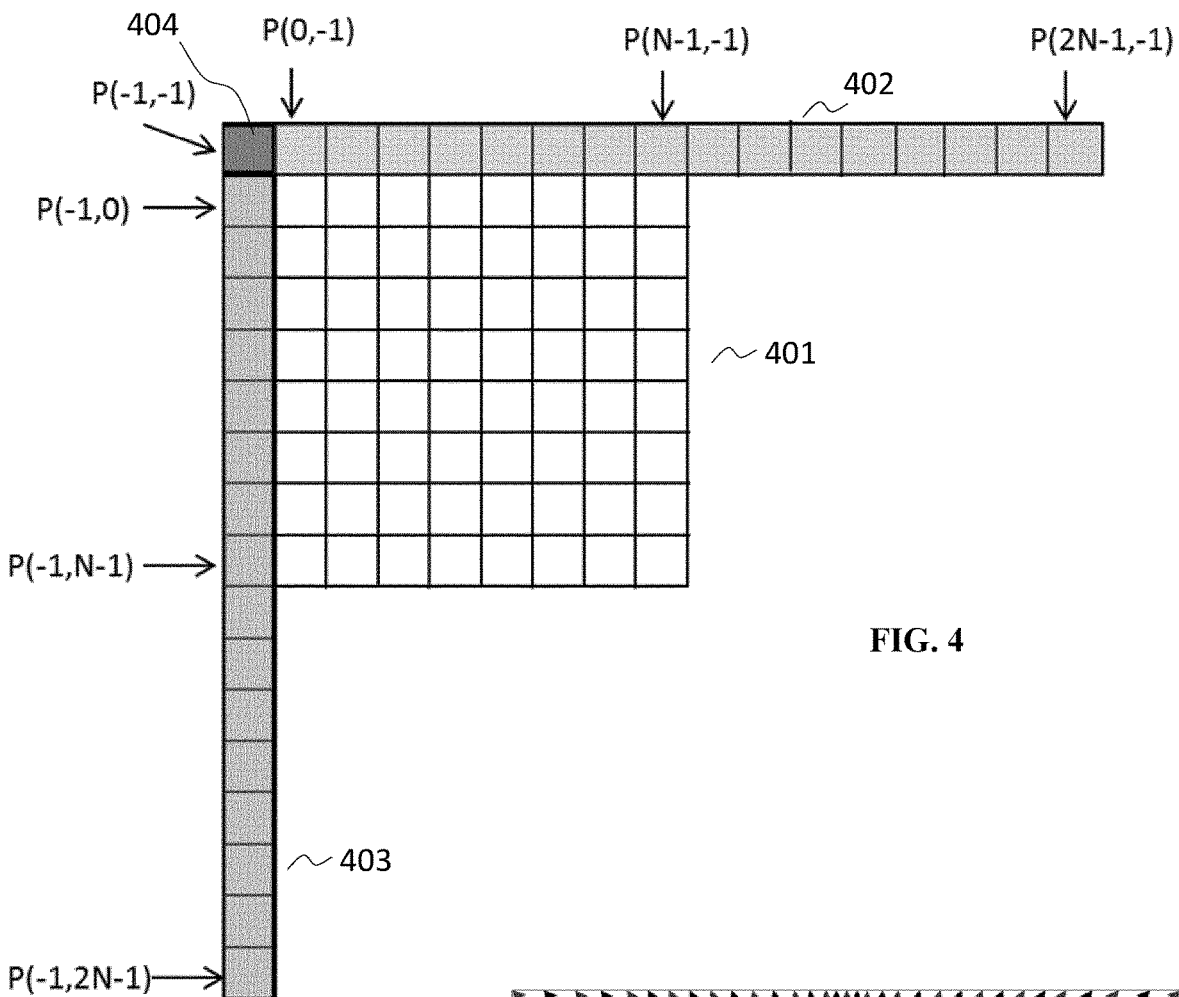
FIG. 4 illustrates an example of reference sample generation process for intra prediction.

FIG. 4 illustrates an example of reference sample generation process for intra prediction. In this figure, reference samples for intra prediction are shown in the case of a square current block (W=H=N), the pixel values at coordinates (x,y) being indicated in the figure by P(x,y). An "above" row (402, in light grey background) of 2 W samples is formed from the previously decoded pixels located above the current block (401, on white background), W denoting the block width. Similarly, a "left" column (403, in light grey background also) of 2H samples is formed from the decoded pixels located on the left side of the current block, H denoting the block height. The corner pixel (404) is also used to fill up the gap between the "above" row and the "left" column references. If some of the samples above the current block and/or on its left side are not available, (because, for example, the corresponding Coding Blocks (CBs) is not in the same slice or the current CB is at a frame boundary), a method called reference sample substitution is performed where the missing samples are copied from the available samples in a clock-wise direction. Next, depending on the current CU size and the prediction mode, the reference samples are filtered using a specified filter.

Figure 5:
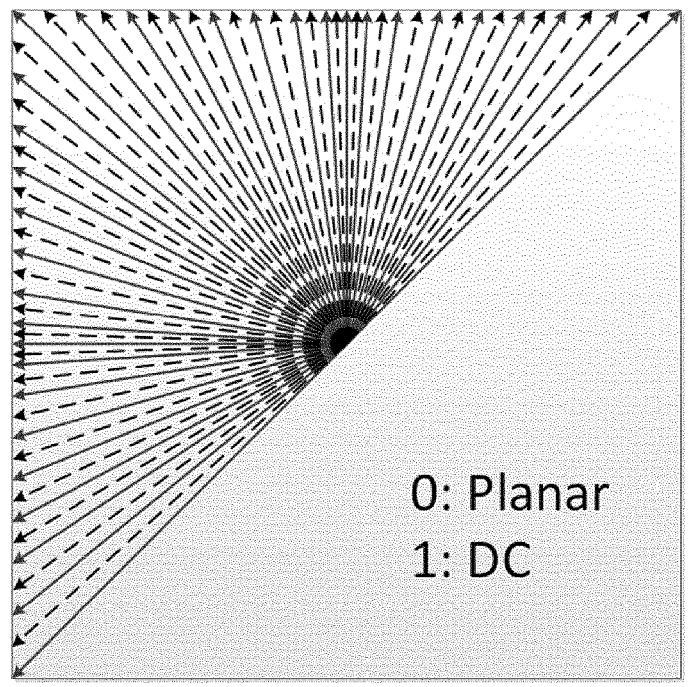
FIG. 5 illustrates an example of angular prediction mode.

FIG. 5 illustrates an example of angular prediction mode. Multiple modes are used for example in HEVC and JEM/JVET. The DC mode generates a mean value by averaging reference samples, and all the predicted samples takes this mean value. The PLANAR mode linearly combines a vertical extrapolation of the "above" row of reference samples from top to bottom and a horizontal extrapolation of the "left" column of reference samples from left to right. Both modes are used to predict smooth and gradually changing regions and thus are generally used for flat surfaces. In contrast, angular prediction modes are used to capture different directional structures. HEVC uses 33 directional prediction modes while there exist 65 directional prediction modes in H.266 which are organized differently for each rectangular block shape. These prediction modes correspond to different prediction directions as illustrated in FIG. 5.

The intra prediction was further expanded from HEVC by the introduction of other intra prediction tools proposed for example by JEM/JVET, such as Multiple Reference Lines (MRL) that allows the use of a pair of a row and a column of reference samples (a.k.a reference line) different from the adjacent row and column shown in FIG. 4, intra prediction with Sub-Partitions (ISP) that further splits the block into sub partitions, and Matrix Intra-prediction (MIP).

Figure 6:
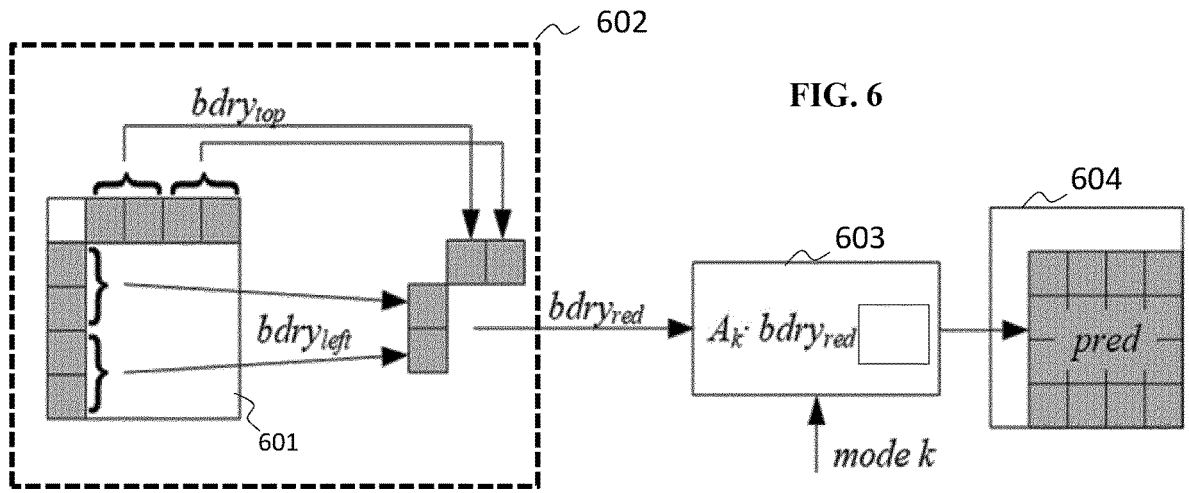
FIG. 6 illustrates an example of matrix based intra prediction mode.

FIG. 6 illustrates an example of matrix based intra prediction mode. Matrix Intra Prediction (MIP) applies to luminance blocks exclusively. The prediction of a W×H luminance block (601) via MIP is decomposed into three steps. First, the W decoded reference samples above the block (bdry$_{top}$) and the H decoded reference samples on its left side (bdry$_{left}$) are down-sampled (602). Then, the result of the down-sampling is linearly transformed (603) into a reduced prediction according a selected mode k. Finally, the reduced prediction is linearly interpolated (604) such that the interpolated prediction has the same size as the block. If W=4 and H=4, 32 MIP modes are existing.

Figure 7:
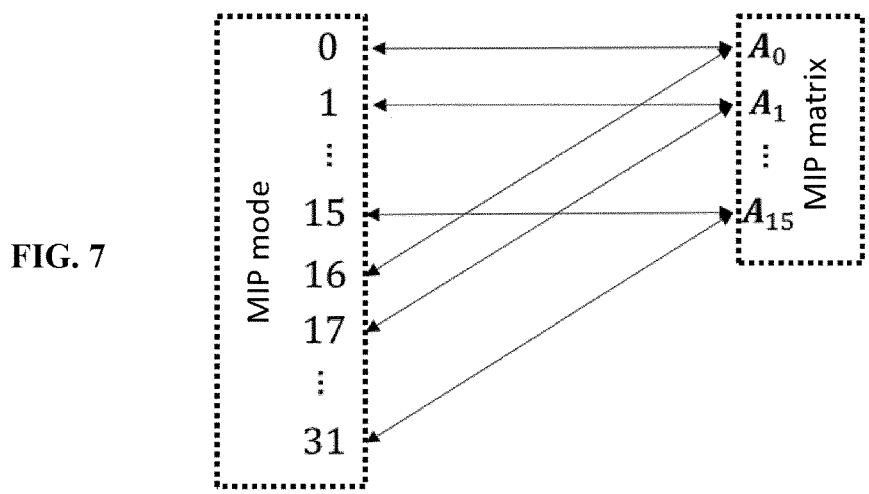
FIG. 7 illustrates an example of mapping between MIP mode index and MIP matrix index.

FIG. 7 illustrates an example of mapping between MIP mode index and MIP matrix index. The example applies to a 4×4 luminance block to be predicted. These modes are split into pairs, each pair using the same MIP matrix, but, for the second mode of each pair, the down-sampled reference samples above the luminance block and the down-sampled reference samples on its left side are swapped. When the swap of the down-sampled reference samples applies, the reduced prediction is first transposed before being interpolated.

Given the previous explanation, in MIP, the process of down-sampling the decoded reference samples and interpolating the reduced prediction enables to reuse the same set of matrices for predicting luminance blocks of different sizes, thus limiting the number of needed MIP matrices, i.e. the number of matrix coefficients to be stored in memory of decoder or encoder. When each MIP matrix coefficient is coded using 8 bits, the memory footprint of the MIP matrix coefficients only amounts for 5120 bytes.

Figure 8:
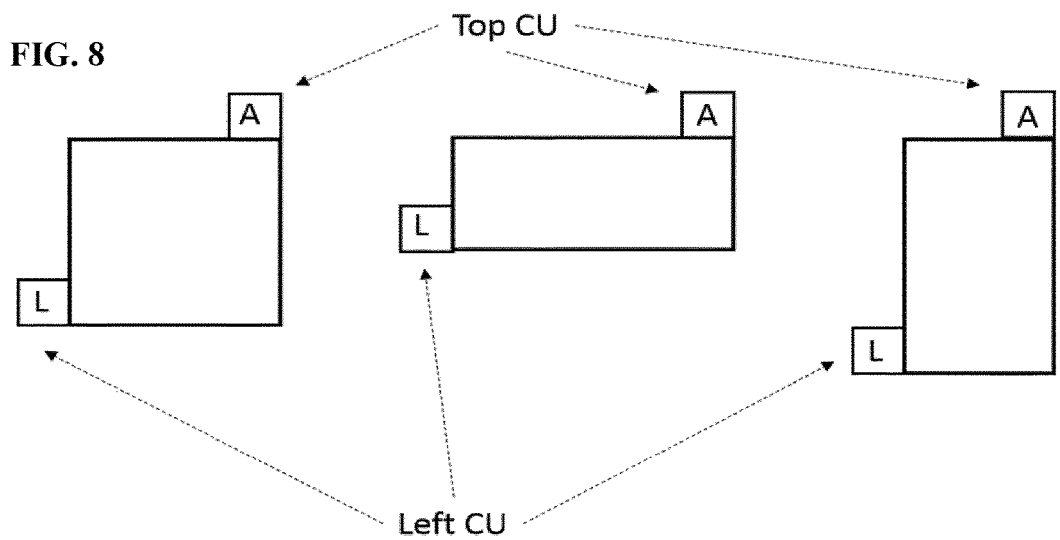
FIG. 8 illustrates an example of above and left CU locations for deriving the most probable mode list for different block shapes.

FIG. 8 illustrates an example of above and left CU locations for deriving the most probable mode list for different block shapes. Indeed, regarding the signaling of these intra prediction modes, the encoder selects the best intra prediction mode according to a rate-distortion criterion and its index is transmitted to the decoder. To perform the signaling of the selected mode index via entropy coding, a list of Most Probable Modes (MPMs) is built. For example, an MPM list can contain 6 intra prediction modes for signaling the intra prediction mode of the current block. The MPM list is created from the prediction modes of the intra coded CUs located above and on the left side of the current CU and some default modes. The above and left CUs are at the right and bottom edge of the current block, as shown in FIG. 8.

An example of computation of the MPM list is given hereunder.

```
L = intra prediction mode of the left CU whose index belongs to [[0, 66]]
A = intra prediction mode of the above CU whose index value belongs to [[0, 66]]
offset = 61
mod = 64
Initialization of the MPM list:
        MPM[0] = PLANAR_IDX
        MPM[1] = DC_IDX
        MPM[2] = VER_IDX
        MPM[3] = HOR_IDX
        MPM[4] = VER_IDX - 4
        MPM[5] = VER_IDX + 4
if (L == A)
  if (L > DC_IDX)
     MPM[0] = PLANAR_IDX
     MPM[1] = L
     MPM[2] = ((L + offset) % mod) + 2
     MPM[3] = ((L - 1) % mod) + 2
     MPM[4] = ((L + offset - 1) % mod) + 2
     MPM[5] = (L % mod) + 2
  else
     use initialized values
else
  if ((L > DC_IDX) && (A > DC_IDX))
     MPM[0] = PLANAR_IDX
     MPM[1] = L
     MPM[2] = A
     MPM[3] =              ((min(L, A) + offset) % mod) + 2 if (*)
                           ((min(L, A) - 1) % mod) + 2 if (**)

((min(L, A) - 1) % mod) + 2 if (***)
                           ((min(L, A) + offset) % mod) + 2 if (****)
     MPM[4] =              ((max(L, A) - 1) % mod) + 2 if (*)
                           ((max(L, A) + offset) % mod) + 2 if (**)

((min(L, A) + offset) % mod) + 2 if (***)
                           ((min(L, A) - 1) % mod) + 22 if (****)
     MPM[5] =              ((min(L, A) + offset - 1) % mod) + 2 if (*)
                           (min(L, A) % mod) + 2 if (**)

((max(L, A) - 1) % mod) + 2 if (***)
                           ((max(L, A) + offset) % mod) + 2 if (****)
  else if (L + A >= 2)
     MPM[0] = PLANAR_IDX
     MPM[1] = max(L, A)
     MPM[2] = ((max(L, A) + offset) % mod) + 2
     MPM[3] = ((max(L,A) - 1) % mod) + 2
     MPM[4] = ((max(L, A) + offset - 1) % mod) + 2
     MPM[5] = (max(L, A) % mod) + 2
``` else
    use initialized values
with
  (*) max(L, A) − min(L, A) == 1
  (**) max(L, A) − min(L, A) >= 62
  (***) max(L, A) − min(L, A) == 2
  (****) all other cases If the selected intra prediction mode for predicting the current block corresponds to one of the six MPM modes, it is signaled via mpmFlag with value 1. Then, the candidate mode from the MPM list is signaled using the variable length coding scheme shown in Table 1. Otherwise, mpm-Flag is equal to 0 and the candidate index in the set of remaining 61 modes is truncated binary encoded using either 5 or 6 bits.

TABLE 1

| Candidate Index | Code |
| --- | --- |
| MPM[0] | 0 |
| MPM[1] | 10 |
| MPM[2] | 110 |
| MPM[3] | 1110 |
| MPM[4] | 11110 |
| MPM[5] | 11111 |

For intra prediction with MRL, the reference line used for the prediction is signaled with multiRefIdx. The value of multiRefIdx can be either 0, 1, or 2, encoded respectively as 0, 10, and 11, signaling respectively the first, second, and third reference lines. When multiRefIdx>0, the prediction mode always belongs to the MPM list. Thus, mpmFlag is not signaled. Furthermore, PLANAR is excluded from the list. This means that only 5 MPMs are available as possible candidates. When multiRefIdx>0, the prediction mode is signaled as shown in Table 2.

TABLE 1

| Candidate index | Code |
| --- | --- |
| MPM[1] | 0 |
| MPM[2] | 10 |
| MPM[3] | 110 |
| MPM[4] | 1110 |
| MPM[5] | 1111 |

For ISP, the type of partitioning used for the CU is signaled with ispMode. The value of ispMode can be either 0, 1, or 2, encoded respectively as 0, 10, and 11, signaling respectively no partitioning, horizontal partitioning, and vertical partitioning. ispMode is encoded only when multi-RefIdx is equal to 0.

A MIP mode is first signaled with mipFlag, a value of 1 meaning that a MIP mode is used to predict the current luminance block, 0 meaning that one of the 67 conventional intra prediction modes is used. When mipFlag is equal to 1, multiRefIdx is inferred to 0 and ispMode is inferred to 0. Therefore, when mipFlag is equal to 1, multiRefIdx and ispMode are not written to the bitstream. If mipFlag is equal to 1, mipTransposedFlag is written to the bitstream to indicate if the down-sampled reference samples above the current luminance block and the down-sampled reference samples on its left side are swapped for the selected MIP mode. Finally, the index of the MIP matrix of the selected MIP mode is then truncated binary encoded.

To handle the case where the intra prediction mode for predicting the current block is one of the 67 conventional intra prediction modes and the selected mode for predicting the above CU or the one for predicting the left CU is a MIP mode, a mapping between each MIP mode and one of the 67 conventional intra prediction modes enables to substitute this MIP mode with its mapped mode. In some implementations, any MIP mode is mapped to PLANAR.

Figure 9:
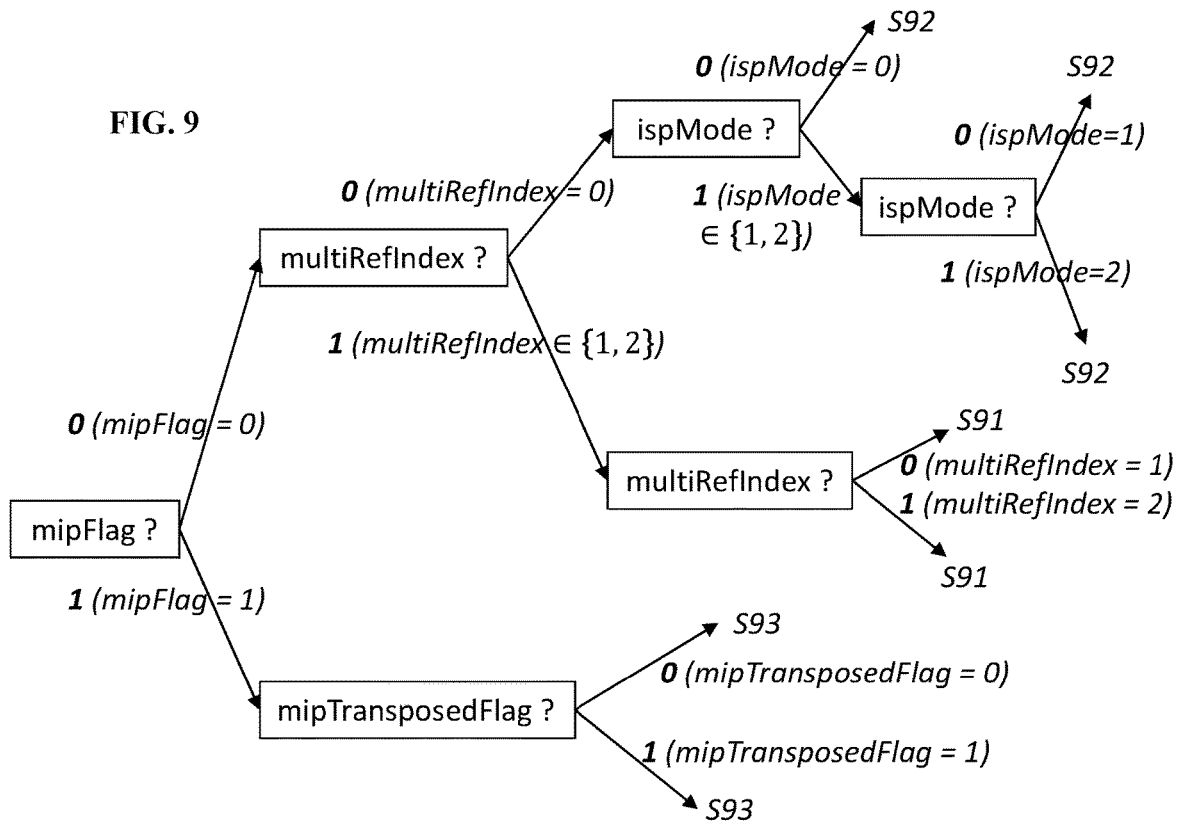
FIG. 9 illustrates an example of decision tree illustrating the intra prediction signaling for luminance as introduced above.

FIG. 9 illustrates an example of decision tree illustrating the intra prediction signaling for luminance as introduced above. In this figure, different prediction mode flags are tested and a final state is reached with a corresponding signaling. In case of state S91, one MPM out of the 5 MPMs are signaled as illustrated in Table 2, thus requiring 1 to 4 bits, and coding ends. In case of state S92, if the condition that mpmFlag=0, a non-MPM mode is signaled thus requiring either 5 or 6 bits, and coding ends, else if the condition that mpmFlag=1, one MPM out of the 6 MPM is signaled as illustrated in Table 1, thus requiring 1 bin and 0 to 4 bits, and coding ends. In case of state S93, a truncated binary encoding of the index of the MIP matrix of the MIP mode is signaled, thus requiring 4 bits for 4×4 blocks, 3 bits for 4×8, 8×4, 8×8 blocks or 2 to 3 bits for other block sizes, and coding ends.

In this figure, the rectangle indicates a test and the italic text represents the condition and shows at the same time the value of the bin (bin value in bold) and the value of the flag (text inside the parenthesis). Indeed, in some cases a bin value of 0 represents a flag value of 1 and vice versa. The same principle applies to all further similar figures in this document.

Figure 10:
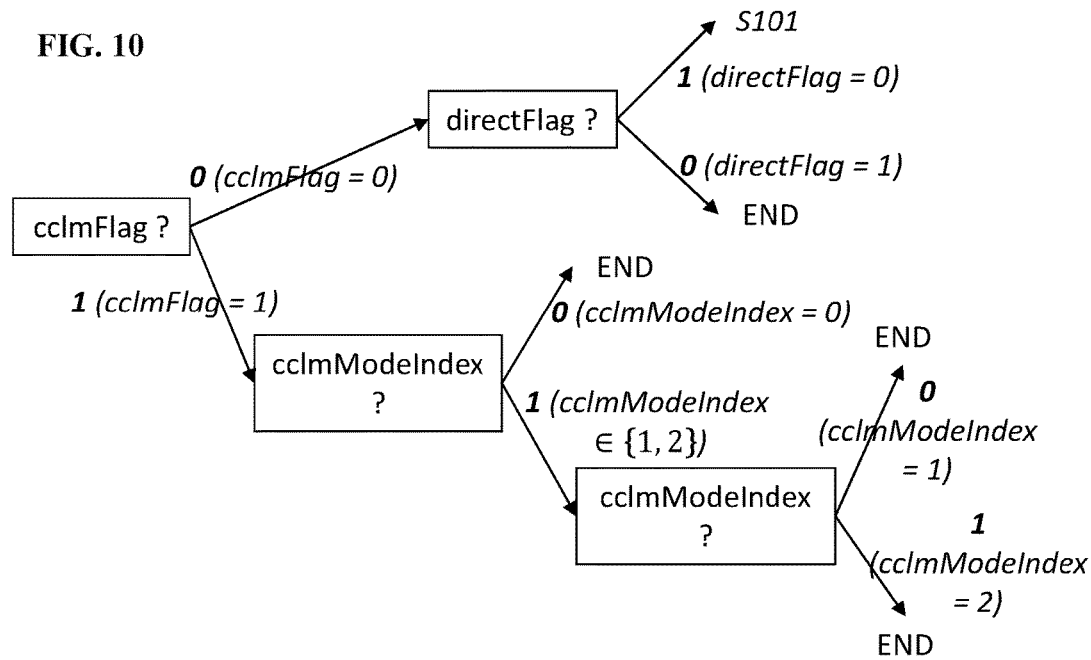
FIG. 10 illustrates an example of decision tree illustrating the intra prediction signaling for chrominance.

FIG. 10 illustrates an example of decision tree illustrating the intra prediction signaling for chrominance. In this figure, different prediction mode flags are tested and a final state is reached with a corresponding signaling. For the two chrominance channels, neither MRL nor ISP nor MIP is used. However, two specific tools can be used: the direct mode and Cross-Component Linear Model (CCLM). The direct mode corresponds to the application of the selected mode for predicting the collocated luminance block to the prediction of the current chrominance block. If directFlag is equal to 1, the direct mode is selected for predicting the current chrominance block. Otherwise, directFlag is equal to 0, and one mode in the list $L_c$=[PLANAR, vertical, horizontal, DC] is selected, $L_c$ listing the different candidate intra prediction modes for chrominance. If a mode in $L_c$ is equal to the direct mode, this mode is replaced by the mode of index 66. In CCLM, a linear model predicts the current chrominance block from the decoded luminance reference samples surrounding the collocated luminance block. The parameters of the linear model are derived from the decoded reference samples. There exist three CCLM modes, each associated to a different derivation of the parameters. If cclmFlag is equal to 1, one of the three CCLM modes is selected. In this case, directFlag is not written to the bitstream. Otherwise, cclm- Flag is equal to 0, and either the direct mode or one of the modes in $L_c$ is selected. In case of state S101, a truncated binary encoding of the non-direct mode among the 4 non-direct modes is signaled and coding ends.

Figure 11:
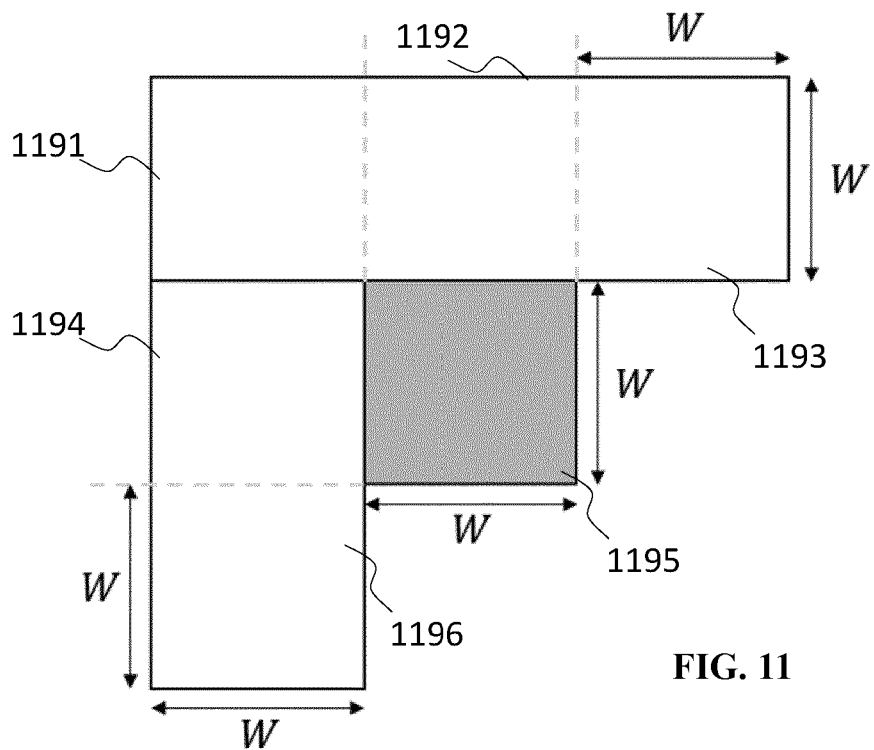
FIG. 11 illustrates an example of context surrounding the current square block to be predicted for a neural network-based intra prediction.

FIG. 11 illustrates an example of context surrounding the current square block to be predicted for a neural network-based intra prediction. A neural network for intra prediction infers from the context surrounding the current block (1195) a prediction of this block. The figure shows the current square block Y of size W×W on grey background (1195) and the context X on white background. The context X is composed of decoded pixels located above (1192) the current block Y (1195) and on its left side (1194) and is extended towards the top left (1191), the top right (1193) and the left bottom (1196). Thanks to this extension, the neural network can learn a relationship between the spatial correlations in its input context and the prediction it gives.

Figure 12:
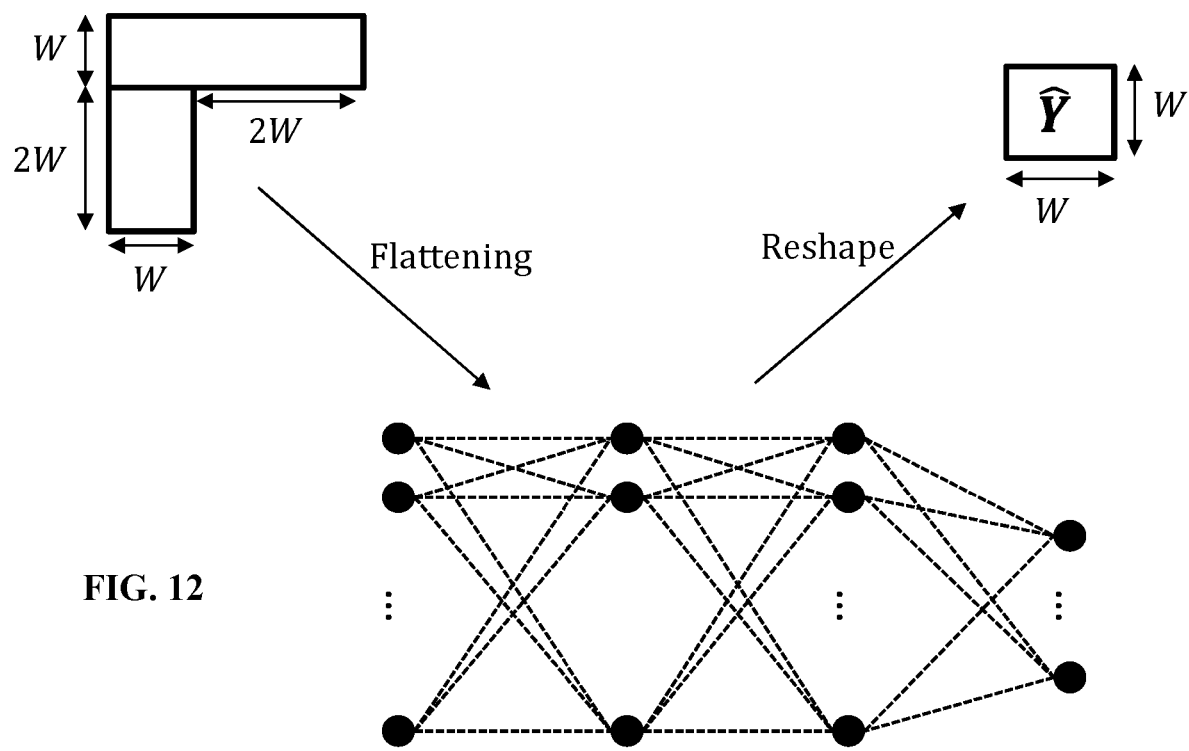
FIG. 12 illustrates an example of intra prediction via a fully-connected neural network.

FIG. 12 illustrates an example of intra prediction via a fully-connected neural network. If the neural network is fully-connected, the context is typically re-arranged into a vector, and the resulting vector is fed into the neural network. Then, the vector provided by the neural network is reshaped to the shape of the current block, yielding the prediction $\hat{Y}$.

Figure 13:
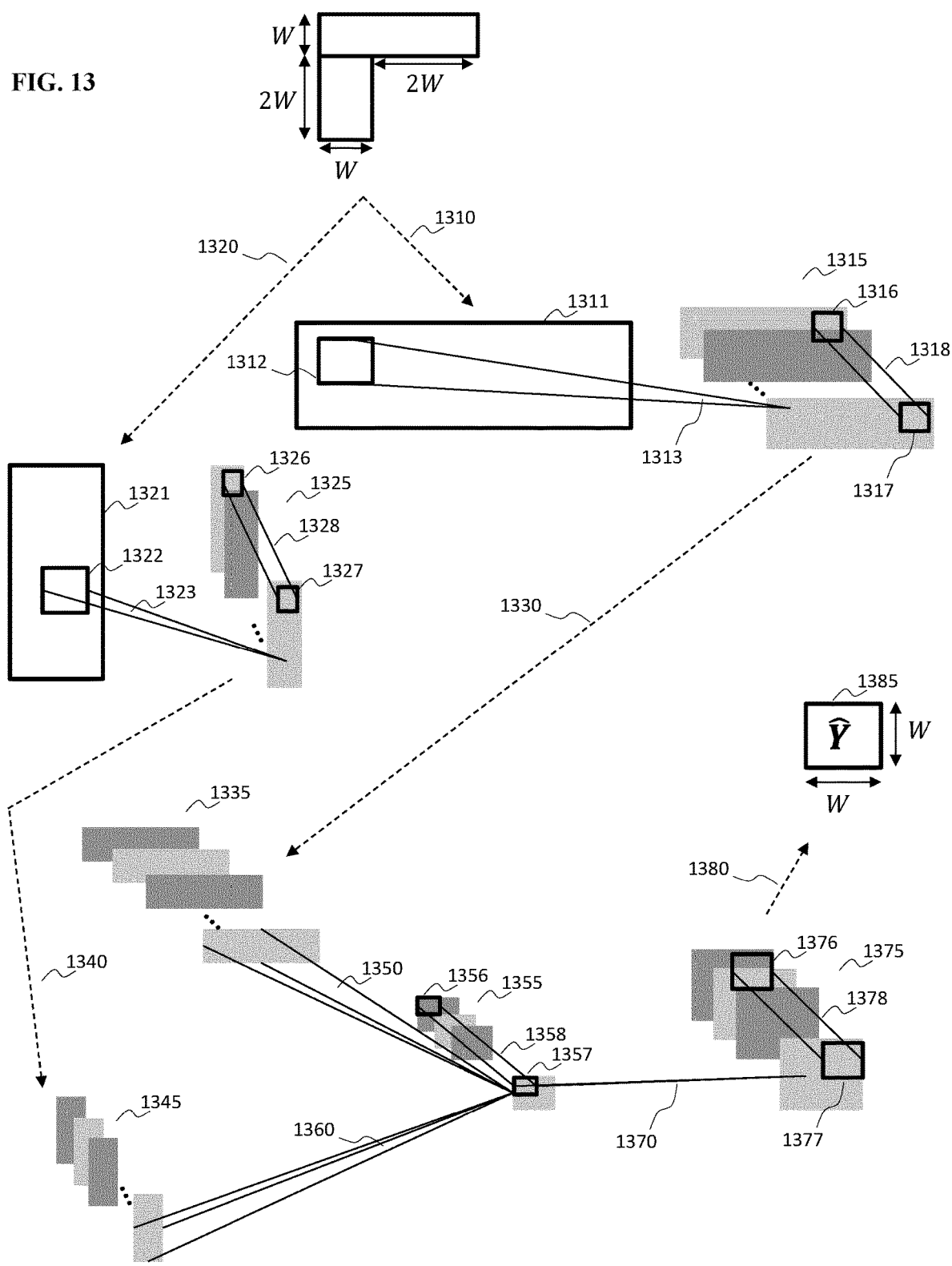
FIG. 13 illustrates an example of intra prediction via a convolutional neural network.

FIG. 13 illustrates an example of intra prediction via a convolutional neural network. The following description details an example of use of convolutional neural network for predicting a W×W block. It is decomposed into the following stages.

The context of this block is split into (1310) a 3W×W portion above this block and (1320) a 2W×W portion on the left side of this block.

The portion above this block (1311) is fed into a first stack of convolutional layers, yielding the stack of feature maps 1335. More precisely, the first layer of the first stack of convolutional layers acts as follows. The portion above the block (1311) is convolved with the 2D filter 1312 and a bias is added to each coefficient of the result of the convolution. This cascade of two operations is repeated using each time a different pair of a 2D filter and a bias. A non-linear function is applied to the result of the convolutions and additions of biases, yielding the stack of feature maps 1315.

Then, the second layer of the first stack of convolutional layers behaves as follows. The stack of feature maps 1315 is convolved with a 3D filter and a bias is added to each coefficient of the result of the convolution. In FIG. 13, only the first 2D filter 1316 and the last one 1317 in this 3D filter are depicted. This cascade of two operations is repeated using each time a different pair of a 3D filter and a bias. A non-linear function is applied to the result of the convolutions and additions of biases, yielding a new stack of feature maps.

Finally, additional layers can be added to the first stack of convolutional layers (1330), each taking the stack of feature maps returned by the previous layer as input. Each additional layer re-uses the same operations as the second layer, but with a different set of 3D filters and biases, and optionally a different non-linear function. The last layer of the first stack of convolutional layers gives the stack of feature maps 1335.

The portion on the left side of the block (1321) is fed into a second stack of convolutional layers, yielding the stack of feature maps 1345. The description of the second stack of convolutional layers draws from that of the first one, but substituting 1312 with 1322, 1315 with 1325, 1316 with 1326, 1317 with 1327, 1330 with 1340, and 1335 with 1345.

The stack of feature maps 1335 and the stack 1345 are merged via full-connectivity. More specifically, the feature map of index i in 1335 is linearly combined with the feature map of index i in 1345 and a bias is optionally added to the resulting scalar. This cascade of two operations is repeated each time using different weights for the linear combination and a different bias. A non-linear is optionally applied to the result, yielding the feature map of index i in 1355. Note that the above mentioned full-connectivity is map-wise. Yet, it could also be stack-wise. This means that a given coefficient in a given feature map in 1355 results from the linear combination of all the coefficients in both the stack of feature maps 1335 and the stack of feature maps 1345, the optional addition of a bias, and the optional application of the non-linear function.

The stack of feature maps 1355 is fed into a stack of transpose convolutional layers, yielding the W×W prediction of the block 1385. More precisely, each layer in this stack of transpose convolution layers behaves similarly to the second layer of the first stack of convolutional layers, except that a different set of 3D filters and biases, and optionally a different non-linear function are involved. For the first layer of this stack of transpose convolutional layers, 1315 is substituted with 1355, 1316 with 1356, and 1317 with 1357. For the second layer of this stack of transpose convolutional layers, 1315 is substituted with 1375, 1316 with 1376, and 1317 with 1377. The term "transpose" indicates that the standard convolutional stride becomes padding around each coefficient of each input feature map. The number of 3D filters in the last layer of this stack of transpose convolutional layer must be equal to the number of channels of the W×W prediction (i.e. 1).

In block-based video coding systems supporting multiple block sizes and rectangular blocks such as JEM/JVET for example, a neural network-based intra prediction mode includes many neural networks, incurring a large memory footprint for the neural networks parameters. Indeed, as a neural network for intra prediction infers a prediction of a given square or rectangular block from the L-shape context surrounding this block, fully-convolutional architectures can hardly be used. This means that at least one layer of the neural network architecture must be fully-connected. Consequently, the number of neural network parameters is linked to the block size. Because of this dependency, if the neural network-based mode aims at predicting blocks of any size, blocks of each possible size must be predicted by a different neural network inside the neural network-based mode. This would require huge amount of memory for the storage of the neural network parameters. Now, to get a sense of the memory footprint of the parameters in the neural network-based mode, let us say that the neural network-based mode is designed to predict the W×H blocks in a video codec such as JEM/JVET for example, H≥4 and W≥4. As there exist 25 different W×H block size combinations, the neural network-based mode might contain 25 neural networks. Given that a deep neural network for intra prediction may have typically more than one million parameters, the number of neural network parameters to be stored in H.266 exceeds 25 millions.

Furthermore, in conventional video codecs that integrate a neural network-based intra prediction mode, the neural network-based mode is systematically in competition with the existing ones. For the current block to be predicted, a flag is written to the bitstream before all the other flags for intra prediction. The value 1 indicates that the neural network-based intra prediction mode is selected for predicting the current block. In this case, no other flag for intra prediction is written to the bitstream. The value 0 means that one of the regular intra prediction is selected. In this case, the regular flags for intra prediction are then written to the bitstream. This is also valid for JEM/JVET when using MIP since the mipFlag is also written to the bitstream before all the other flags for intra prediction.

Embodiments described hereafter have been designed with the foregoing in mind.

In at least one embodiment, a video coding system performs intra prediction in a mode using a neural network for blocks of only a set of specific block sizes. In at least one embodiment, the signaling of this mode is designed to be efficient in terms of rate-distortion under this constraint. In at least one embodiment, different transformations of the context of a block and the neural network prediction of this block are introduced in order to use one single neural network for predicting blocks of several sizes. In at least one embodiment, the signaling also comprises this mode comprising transformations. In at least one embodiment, the neural network-based prediction mode considers both luminance blocks and chrominance blocks.

Figure 14:
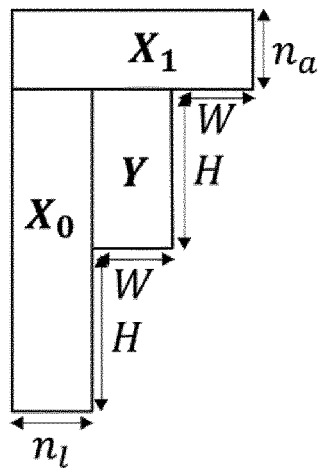
FIG. 14 illustrates an example of selection of a context X surrounding a W×H rectangular block Y to be predicted according to an example embodiment.

FIG. 14 illustrates an example of selection of a context X surrounding a W×H rectangular block Y to be predicted according to an example embodiment. The extended context comprises $n_l$ columns of 2H decoded pixels on the left side of the block and $n_a$ rows of $n_l+2$ W decoded pixels above the block. $n_a$ and $n_l$ should be determined to provide a good tradeoff between two aspects. In the first aspect, for a large block to be predicted, long-range spatial dependencies between decoded pixels above and on the left side of this block are needed to predict this block with relatively high quality. This implies that, for a large block to be predicted, $n_a$ and $n_l$ should be large. In the second aspect, the running time of H.266 with the neural network-based mode increases as $n_a$ and $n_l$ grow. Therefore, the rules (1), (2), (3) defined hereunder are three variant embodiments for defining $n_a$ and $n_l$.

$$n_a = n_l = \min(H, W) \qquad (1)$$

$$n_a = \alpha H, n_l = \beta W, \alpha \in \left[\!\left[\frac{1}{4}, \frac{1}{2}, \frac{3}{4}, 1, 2\right]\!\right], \beta \in \left[\!\left[\frac{1}{4}, \frac{1}{2}, \frac{3}{4}, 1, 2\right]\!\right] \qquad (2)$$

$$n_a = n_l = \max(H, W) \qquad (3)$$

As such, $n_a$ and $n_l$ are parameters that determine the size of the context X surrounding the W×H rectangular block Y to be predicted (hereafter named block context).

In at least one embodiment, neural network based intra prediction mode is signaled without any context pre-transformation (to be introduced below). In this first signaling, the main principle is to predict via the neural network-based mode exclusively blocks of some sizes. For each of these sizes, the pair of the block height and width is put into the set T⊆Q. Q denotes the set of all possible pairs of a block height and width. Then, for a W×H block to be predicted, the neural network-based mode is signaled if it contains the neural network $f_{H,W}(.;\theta_{H,W})$, parametrized by $\theta_{H,W}$, predicting blocks of size W×H. Moreover, the neural network-based mode should not be signaled if the context of the current block to be predicted goes out of the image bounds, i.e. the neural network intra prediction cannot be performed.

Figure 15:
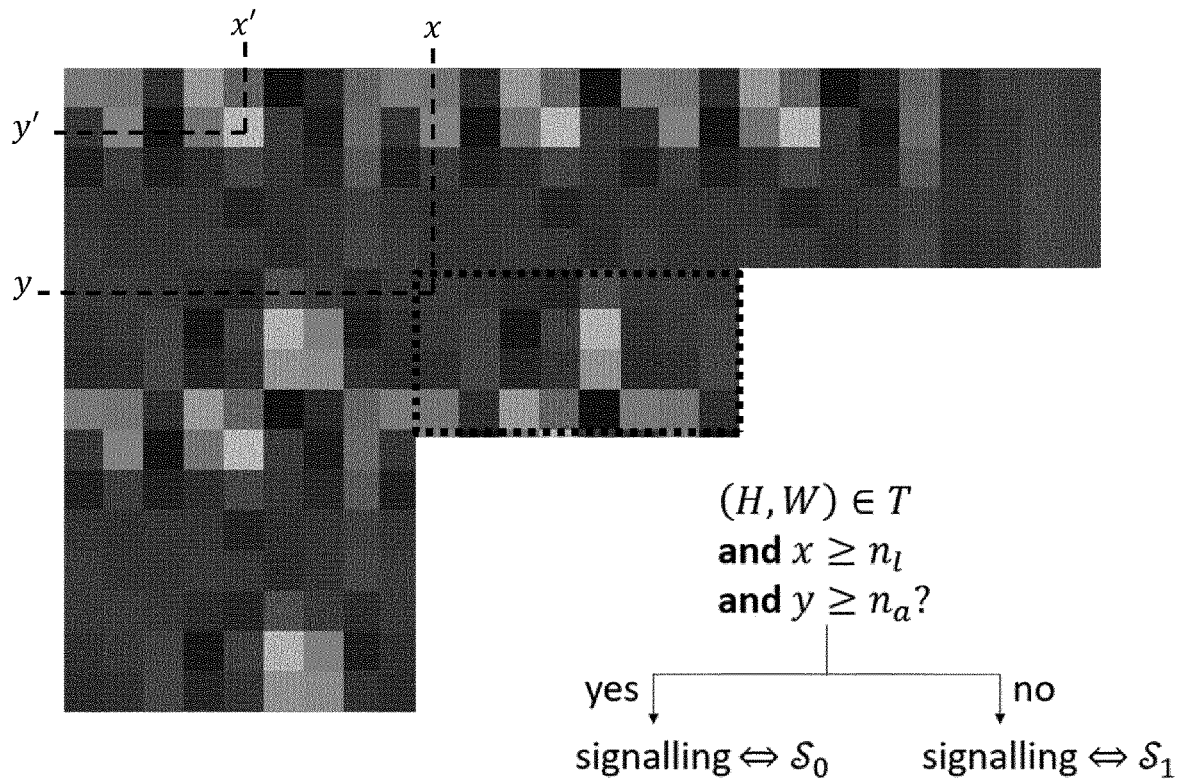
FIG. 15 illustrates an example choice of the intra prediction mode signaling according to at least one embodiment.

FIG. 15 illustrates an example choice of the intra prediction mode signaling according to at least one embodiment. Indeed, given the above-mentioned two considerations, for a W×H luminance Prediction Block (PB) whose top-left pixel is located at (x, y) in the current image, the intra prediction mode signaling $\mathcal{S}_0$ including the flag nnFlag specific to the neural network-based intra prediction mode is picked if (H,W)∈T and x≥$n_l$ and y≥$n_a$. Otherwise, another intra prediction mode signaling $\mathcal{S}_1$ which does not include nnFlag applies. The test with regards to the block position aims at ensuring that it is possible to determine a block context to perform the prediction, in other words, that the block is not too close of the borders of the picture. In this figure, Rule (1) is considered. In a first example of the luminance PB of size 8×4 represented by the dotted white line, the coordinates of the pixel at the top-left of this PB in the frame are x=9, y=5 and thus a neural network based intra prediction can be performed since there is sufficient information available to determine a block context for the prediction. In a second example, for a block (not depicted in the figure) at position x', y', there is no sufficient information available for performing a neural network based intra prediction and thus, another prediction mode should be used for this block.

Figure 16:
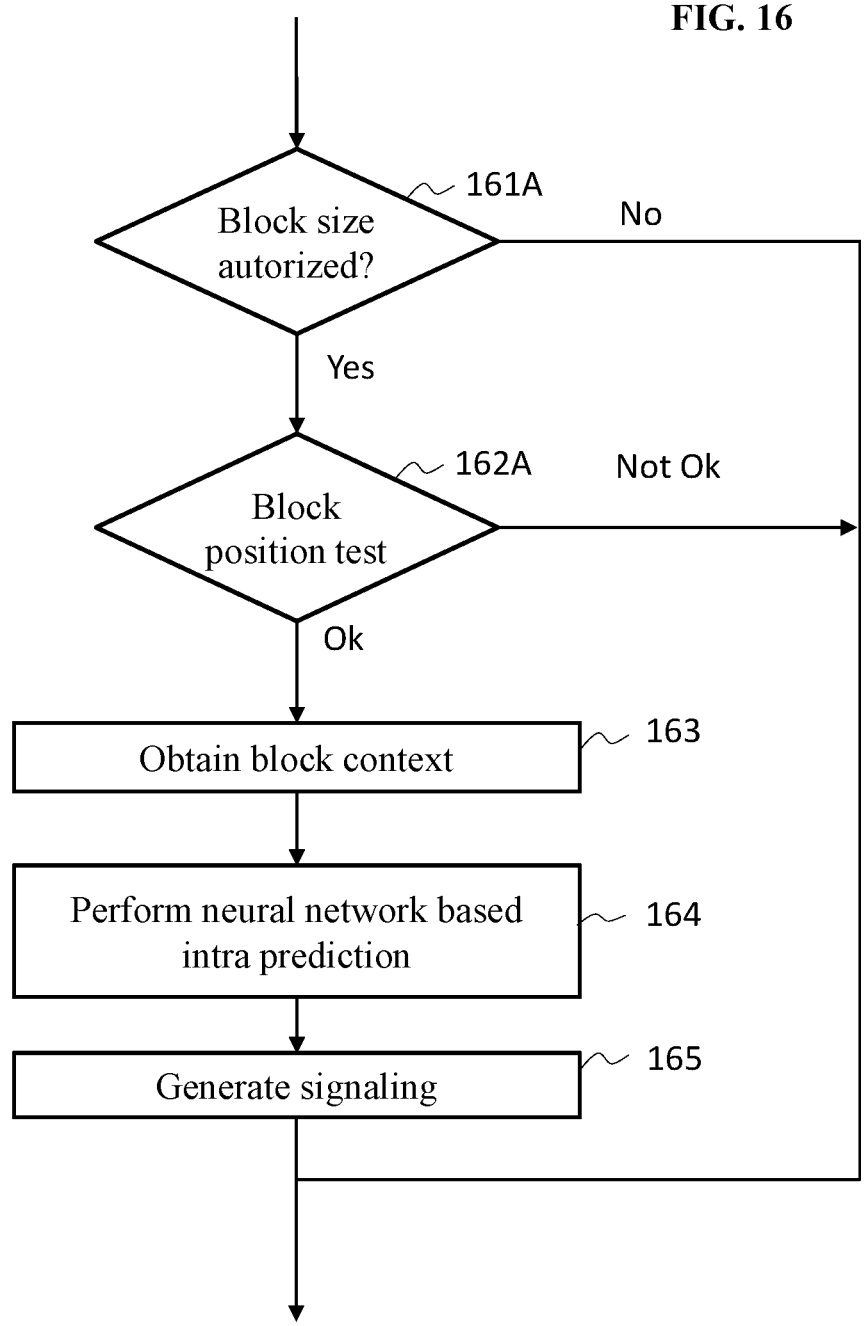
FIG. 16 illustrates an exemplary flowchart of an encoding method for a block implemented by an encoding apparatus according to at least one embodiment.

FIG. 16 illustrates an exemplary flowchart of an encoding method for a block implemented by an encoding apparatus according to at least one embodiment. In step 161A, the size of the block is obtained and compared to a set of authorized sizes for which a neural network is defined. When no neural network is defined for the obtained block size, in branch "No", the block has to be encoded using another mode and thus another signaling will be used. In branch "Yes", the block position is obtained in step 162A and tested towards the size of the block context determined as described below in rules 1, 2 or 3, in other words, towards the values of $n_a$ and $n_l$, as explained above in the description of FIG. 15. When the position is not correct, in branch "Not OK", neural network-based intra prediction cannot be used and the block has to be decoded using another mode. If the position is correct, in branch "Ok", the block context is obtained in step 163 and the neural network based intra prediction is performed, for example as explained above in the description of FIG. 13. Tailored signaling is generated in step 165, for example according to any of the embodiments described hereunder.

Figure 17:
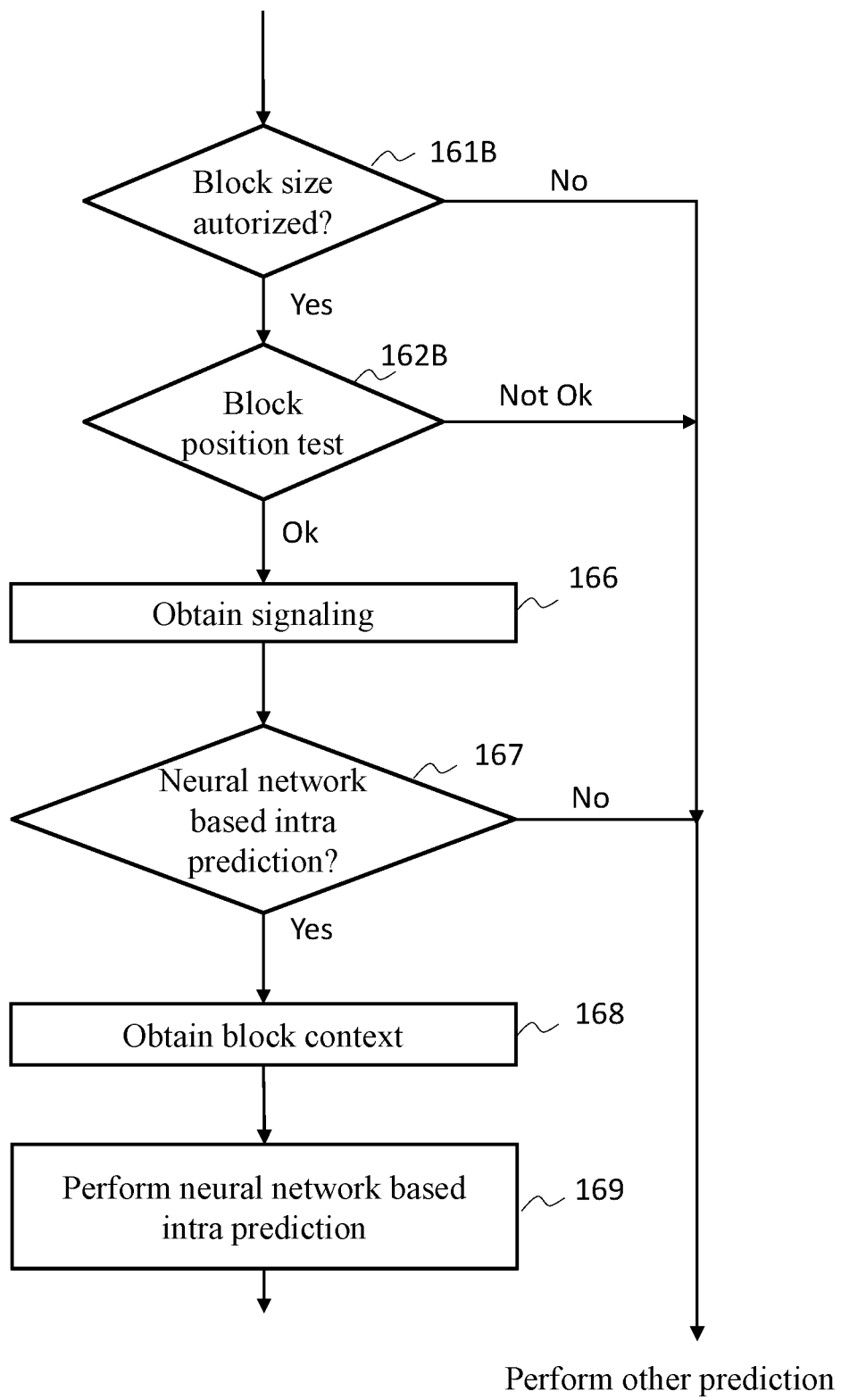
FIG. 17 illustrates an exemplary flowchart of a decoding method for a block implemented by a decoding apparatus according to at least one embodiment.

FIG. 17 illustrates an exemplary flowchart of a decoding method for a block implemented by a decoding apparatus according to at least one embodiment. In step 161B, the size of the block is obtained and compared to a set of authorized sizes for which a neural network is defined. When no neural network is defined for the obtained block size, in branch "No", the block must be decoded using another mode and thus another signaling will be used. In branch "Yes", in step 162B, the block position is obtained and tested towards the size of the block context determined as described below in rules 1, 2 or 3, in other words, towards the values of $n_a$ and $n_l$, as explained above in the description of FIG. 15. When the position is not correct, in branch "Not OK", neural network-based intra prediction cannot be used and the block has to be decoded using another mode. In branch "Ok", in step 166, the decoder obtains intra signaling information for the block. In step 167, the signaling of a neural network based intra prediction for the block is tested. If it is not the case (branch "No"), then another prediction mode is used for the block. In the condition that a neural network based intra prediction for the block (branch "Yes") the block context is obtained in step 168 and the neural network based intra prediction is performed in step 169, for example as explained above in the description of FIG. 13.

The block size and block position tests (steps 161A, 161B, 162A and 162B) are performed on both the encoder and decoder sides. This is required because the decoder needs to know the structure of the decision tree to interpret the bins it reads. The choice between $S_0$ and $S_1$ is not written to the bitstream.

Figure 18:
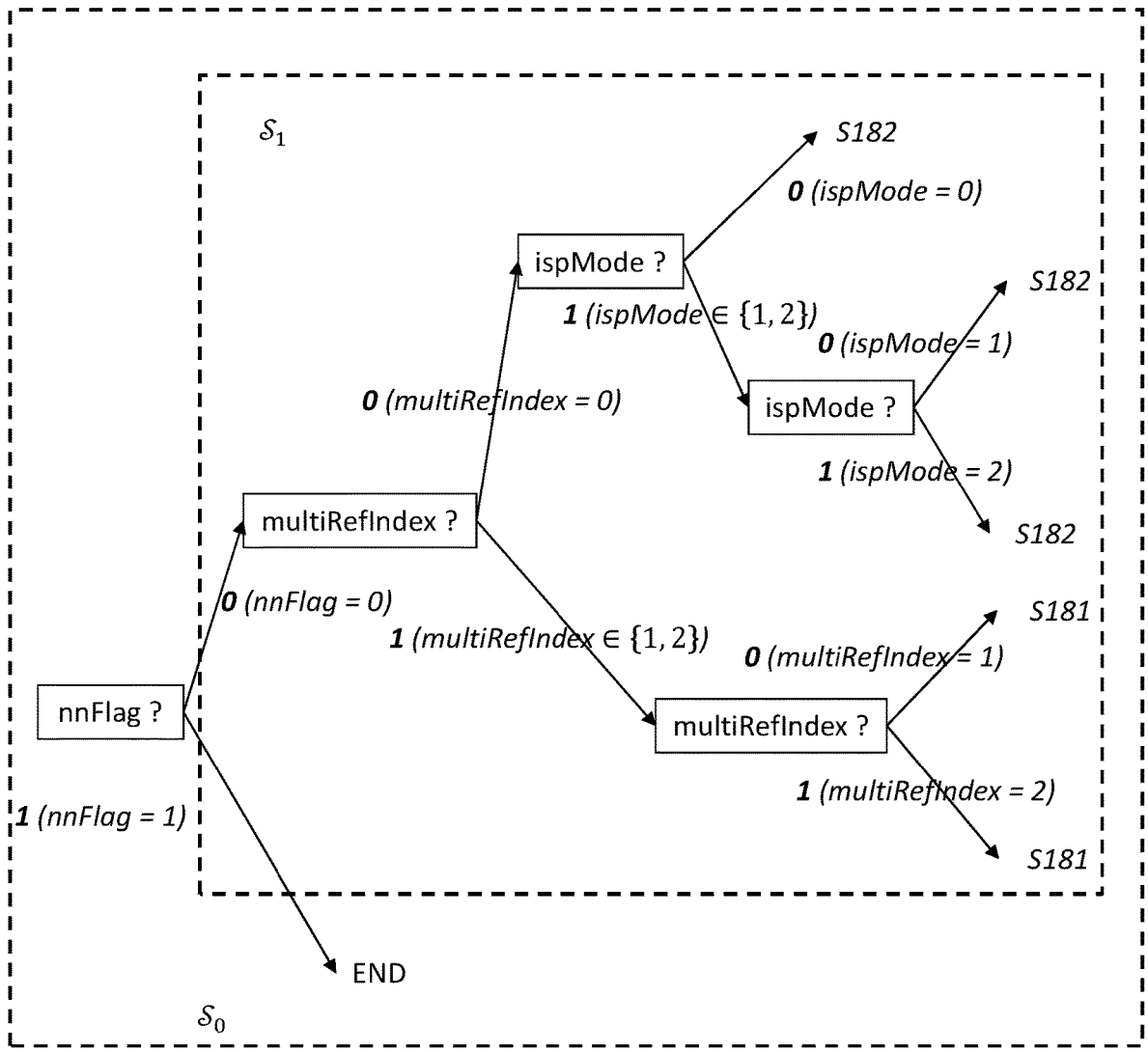
FIG. 18 illustrates an example of decision tree representing the intra prediction mode signaling for the current luminance PB according to an embodiment.

FIG. 18 illustrates an example of decision tree representing the intra prediction mode signaling for the current luminance PB according to an embodiment. In this figure, different prediction mode flags are tested and a final state is reached with a corresponding signaling. In this embodiment, nnFlag is placed first in $S_0$. nnFlag=1 indicates that the neural network-based mode predicts the current luminance PB. In case of state S181, one MPM out of the 5 MPMs are signaled as illustrated in Table 2, thus requiring 1 to 4 bits, and coding ends. In case of state S182, if the condition that mpmFlag=0, a non-MPM mode is signaled thus requiring either 5 or 6 bits, and coding ends, else if the condition that mpmFlag=1, one MPM out of the 6 MPM is signaled as illustrated in Table 1, thus requiring 1 bin and 0 to 4 bits, and coding ends.

Figure 19:
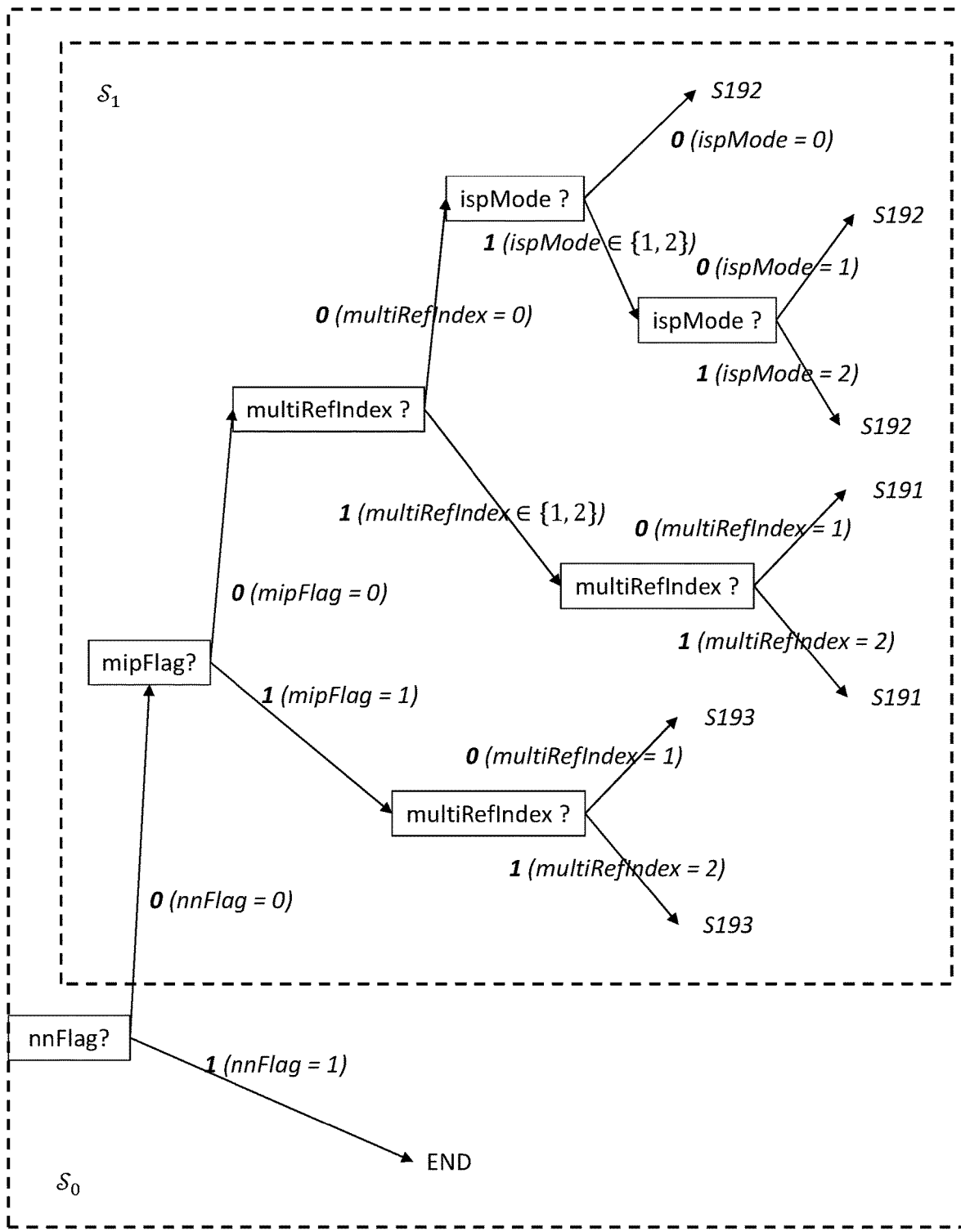
FIG. 19 illustrates an example of decision tree representing the intra prediction mode signaling for the current luminance PB according to a first variant embodiment that also considers MIP mode.

FIG. 19 illustrates an example of decision tree representing the intra prediction mode signaling for the current luminance PB according to a first variant embodiment that also considers MIP mode. In this embodiment, MIP mode is added after the neural network based intra prediction. In case of state S191, one MPM out of the 5 MPMs is signaled as illustrated in Table 2, thus requiring 1 to 4 bits, and END of coding is signaled. In case of state S192, if the condition that mpmFlag=0, a non-MPM mode is signaled, thus requiring either 5 or 6 bits, and END of coding is signaled, else if the condition that mpmFlag=1, one MPM out of the 6 MPM is signaled as illustrated in Table 1, thus requiring 1 bin and 0 to 4 bits, and END of coding is signaled. In case of state S193, a truncated binary encoding of the index of the MIP matrix of the MIP mode is signaled, thus requiring 4 bits for 4×4 blocks, 3 bits for 4×8, 8×4, 8×8 blocks or 2 to 3 bits for other block sizes, and END of coding is signaled.

Figure 20:
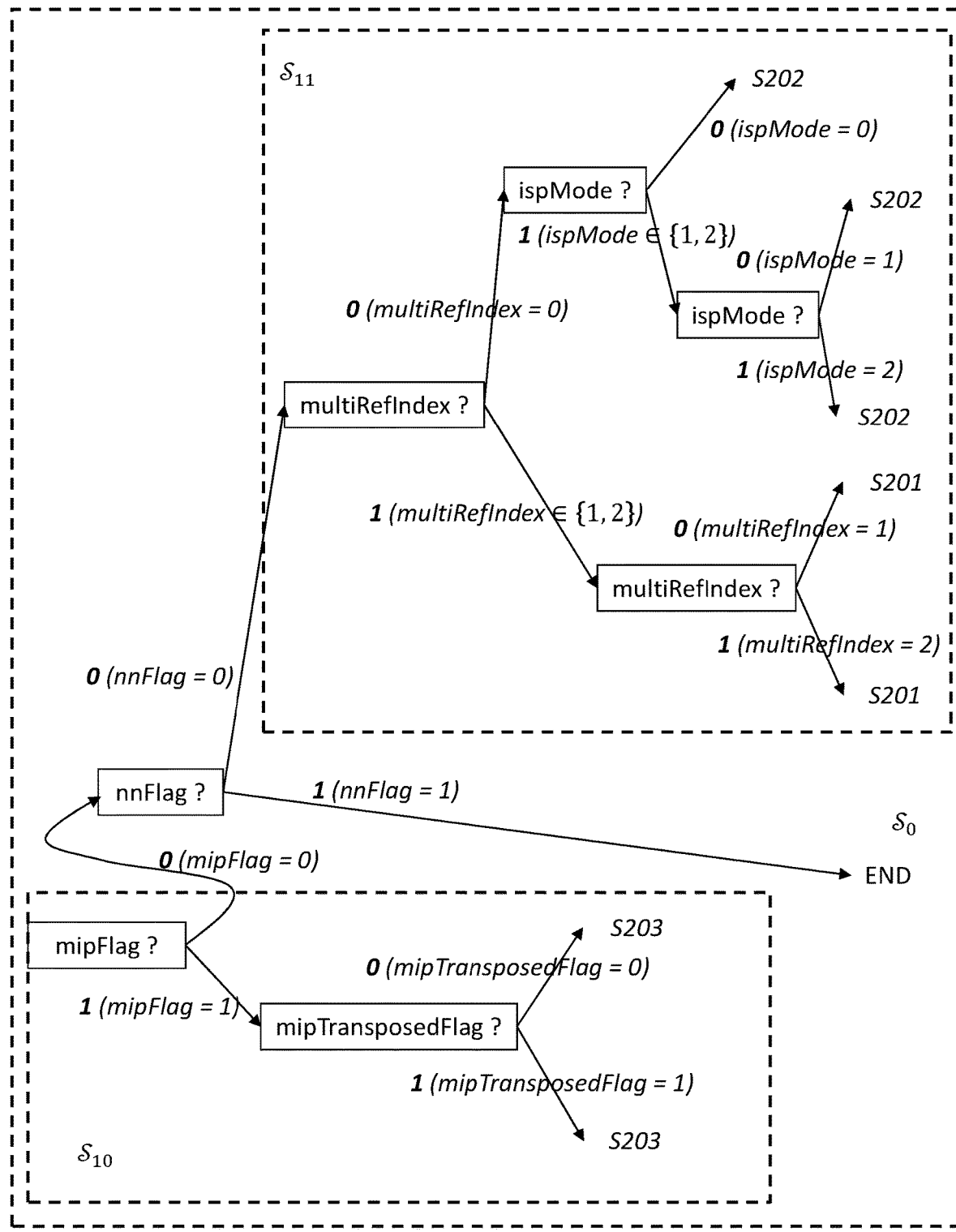
FIG. 20 illustrates an example of decision tree representing the intra prediction mode signaling for the current luminance PB according to a second variant embodiment that considers and favors MIP mode.

FIG. 20 illustrates an example of decision tree representing the intra prediction mode signaling for the current luminance PB according to a second variant embodiment that considers and favors MIP mode. In this embodiment, nnFlag and mipFlag are interchanged to give more importance to MIP mode. In case of state S201, one MPM out of the 5 MPMs is signaled as illustrated in Table 2, thus requiring 1 to 4 bits, and END of coding is signaled. In case of state S202, if the condition that mpmFlag=0, a non-MPM mode is signaled thus requiring either 5 or 6 bits, and END of coding is signaled, else if the condition that mpmFlag=1, one MPM out of the 6 MPM is signaled as illustrated in Table 1, thus requiring 1 bin and 0 to 4 bits, and END of coding is signaled. In case of state S203, a truncated binary encoding of the index of the MIP matrix of the MIP mode is signaled, thus requiring 4 bits for 4×4 blocks, 3 bits for 4×8, 8×4, 8×8 blocks or 2 to 3 bits for other block sizes, and END of coding is signaled. $S_1 = S_{10} \cup S_{11}$.

Figure 21:
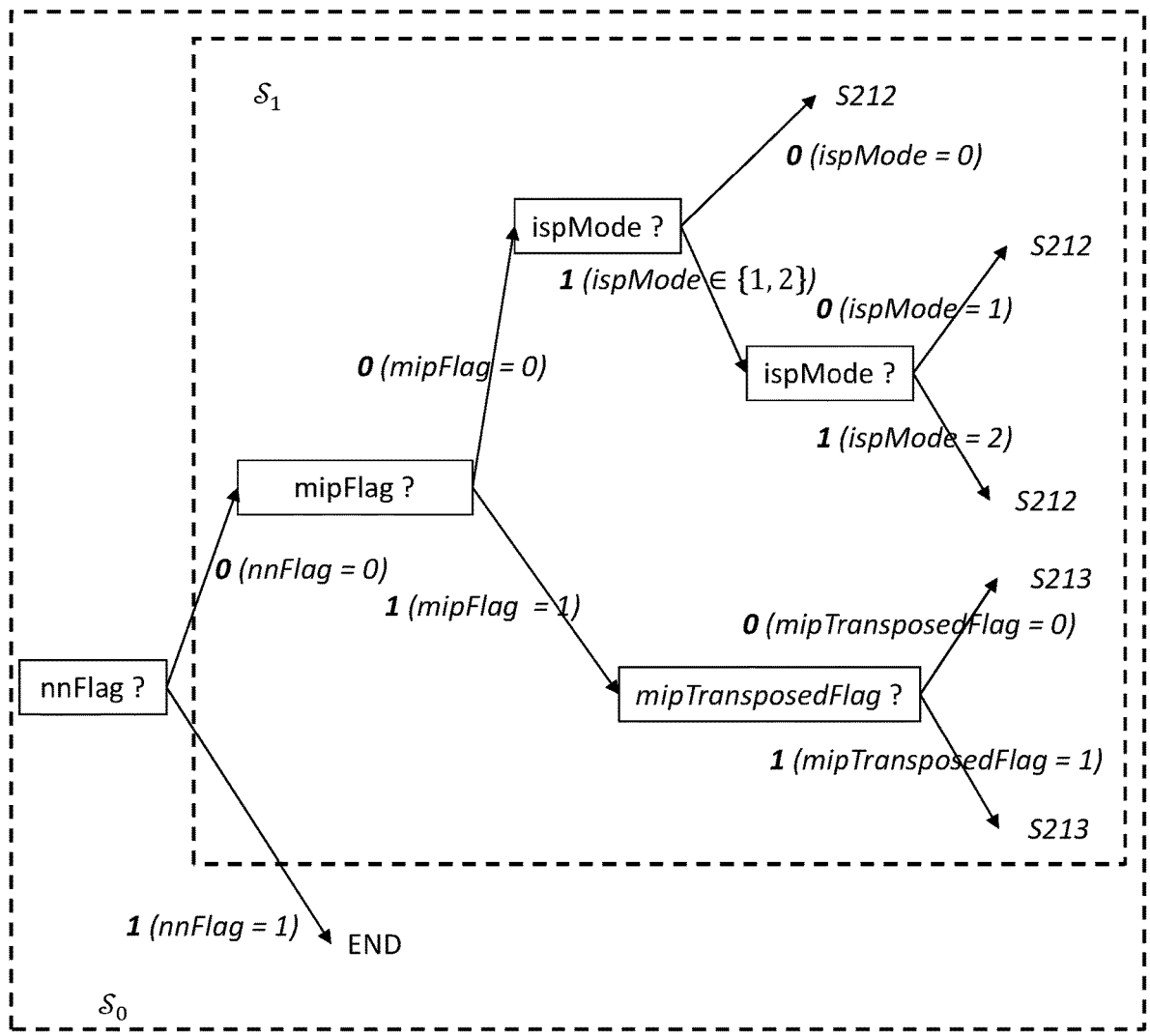
FIG. 21 illustrates an example of decision tree representing the intra prediction mode signaling for the current luminance PB according to a third variant embodiment that does not consider MRL.

FIG. 21 illustrates an example of decision tree representing the intra prediction mode signaling for the current luminance PB according to a third variant embodiment that does not consider MRL mode. MRL can be removed by removing the multiRefIndex. The figure shows the application of this principle to the first variant described above but can be applied to any of the former embodiments. In case of state S212, if the condition that mpmFlag=0, a non-MPM mode is signaled thus requiring either 5 or 6 bits, and END of coding is signaled, else if the condition that mpmFlag=1, one MPM out of the 6 MPM is signaled as illustrated in Table 1, thus requiring 1 bin and 0 to 4 bits, and END of coding is signaled. In case of state S213, a truncated binary encoding of the index of the MIP matrix of the MIP mode is signaled, thus requiring 4 bits for 4×4 blocks, 3 bits for 4×8, 8×4, 8×8 blocks or 2 to 3 bits for other block sizes, and END of coding is signaled.

Figure 22:
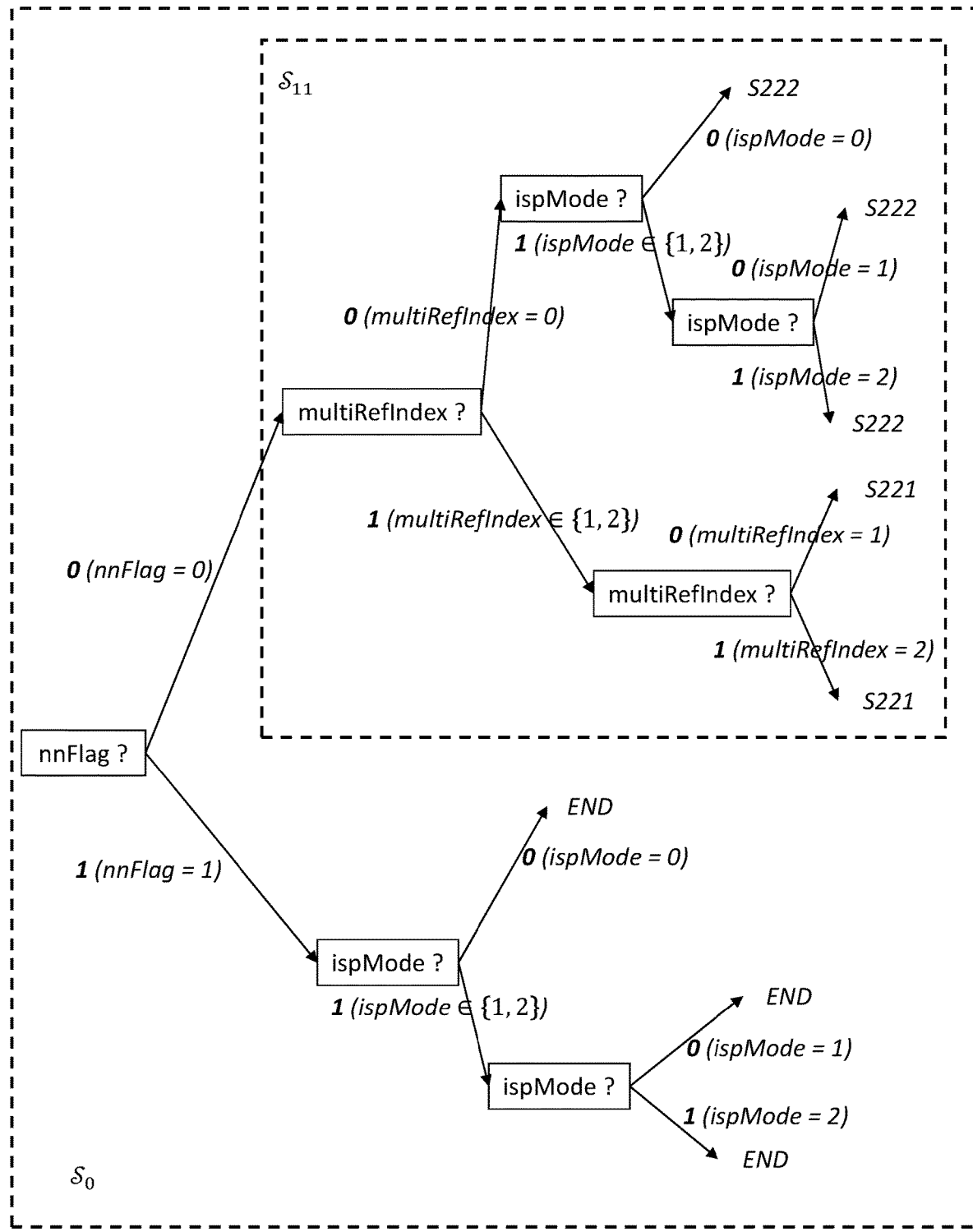
FIG. 22 illustrates an example of decision tree representing the intra prediction mode signaling for the current luminance PB according to a fourth variant embodiment combining the neural network-based intra prediction mode with ISP.

FIG. 22 illustrates an example of decision tree representing the intra prediction mode signaling for the current luminance PB according to a fourth variant embodiment combining the neural network-based intra prediction mode with ISP. In case of state S221, one MPM out of the 5 MPMs is signaled as illustrated in Table 2, thus requiring 1 to 4 bits, and END of coding is signaled. In case of state S222, if the condition that mpmFlag=0, a non-MPM mode is signaled thus requiring either 5 or 6 bits, and END of coding is signaled, else if the condition that mpmFlag=1, one MPM out of the 6 MPM is signaled as illustrated in Table 1, thus requiring 1 bin and 0 to 4 bits, and END of coding is signaled.

Figure 23:
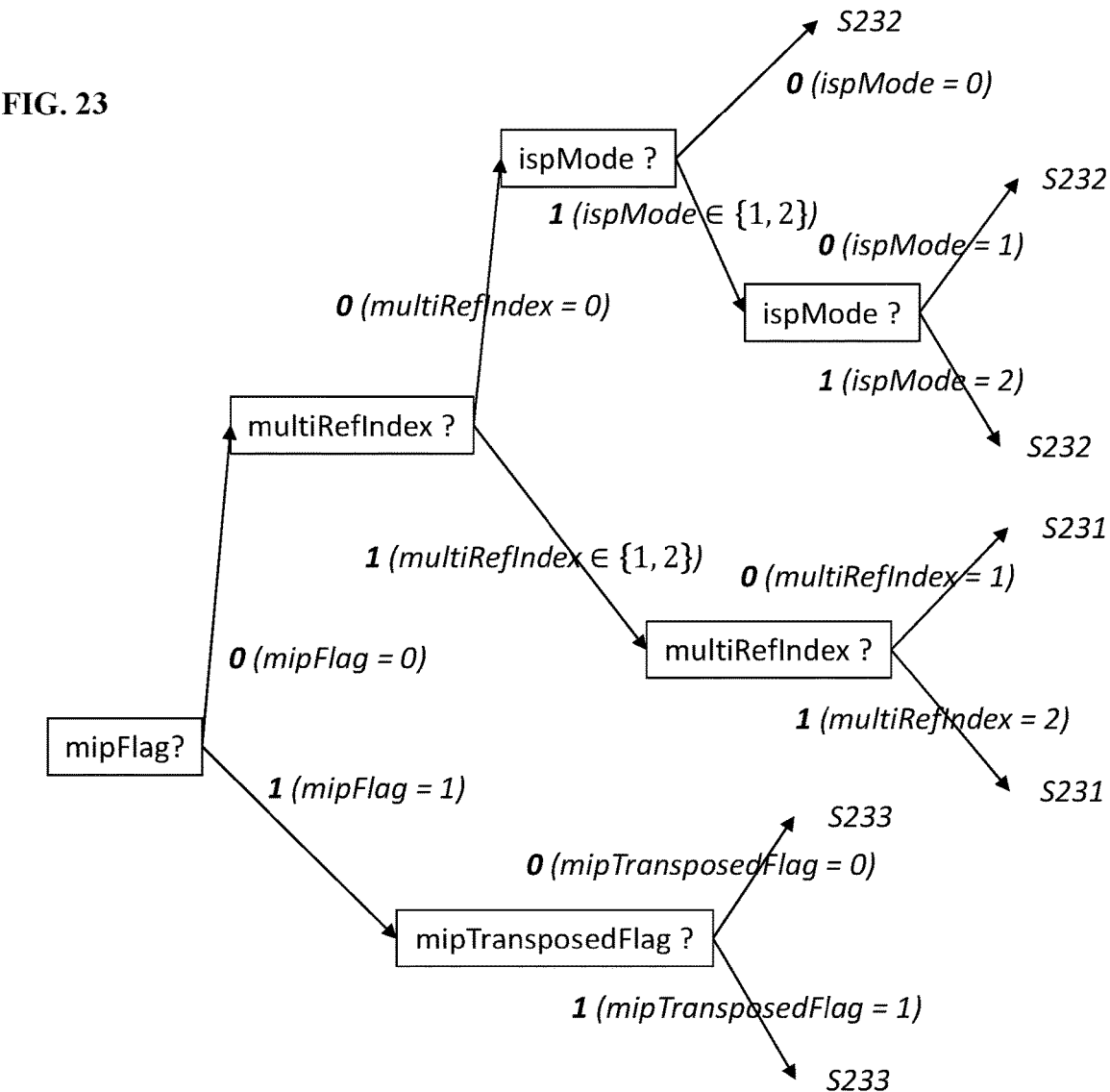
FIG. 23 illustrates an example of decision tree representing the intra prediction mode signaling for the current luminance PB according to a fifth variant embodiment where PLANAR mode is replaced by the neural network-based mode in $S_0$.

FIG. 23 illustrates an example of decision tree representing the intra prediction mode signaling for the current luminance PB according to a fifth variant embodiment where PLANAR mode is replaced by the neural network-based mode in $S_0$. In Table 1, the first MPM is always PLANAR. Therefore, in this embodiment, in $S_0$, the first MPM is always the neural network-based mode. As described earlier, if multiRefIdx>0, the intra prediction mode cannot be PLANAR. Thus, in this embodiment, in $S_0$, if multiRefIdx>0, the intra prediction mode cannot be the neural network-based mode. In this embodiment, if $S_0$ applies, if the intra prediction mode of the left CU is PLANAR, it is mapped to the neural network-based mode during the MPMs derivation. The same goes for the intra prediction mode of the above CU. In this embodiment, if $S_1$ applies, if the intra prediction mode of the left CU is the neural network-based mode, it is mapped to PLANAR during the MPMs derivation. The same goes for the intra prediction mode of the above CU.

In case of state S231, one MPM out of the 5 MPMs is signaled as illustrated in Table 2, thus requiring 1 to 4 bits, and END of coding is signaled. In case of state S232, if the condition that mpmFlag=0, a non-MPM mode is signaled thus requiring either 5 or 6 bits, and END of coding is signaled, else if the condition that mpmFlag=1, one MPM out of the 6 MPM is signaled as illustrated in Table 1, thus requiring 1 bin and 0 to 4 bits, and END of coding is signaled. In case of state S233, a truncated binary encoding of the index of the MIP matrix of the MIP mode is signaled, thus requiring 4 bits for 4×4 blocks, 3 bits for 4×8, 8×4, 8×8 blocks or 2 to 3 bits for other block sizes, and END of coding is signaled.

As another alternative, the fifth variant can be combined with the third variant. In other words, MRL is removed from the intra prediction mode signaling. As another alternative, MIP is removed from the intra prediction mode signaling. The two previous alternatives can be combined.

As stated above, at least one embodiment of the disclosure considers applying the neural network-based intra prediction to both luminance blocks and chrominance blocks. The neural network-based intra prediction of chrominance blocks follows the same principles as for the luminance blocks. However, an appropriate signaling is required for the chrominance elements.

As the neural networks in a neural network-based intra prediction mode are usually trained on pairs of a luminance block and its context, one solution for predicting the current chrominance PB via the neural network-based mode is via the Direct Mode (DM). But, the use of the neural network-based mode via DM is restricted by the two constraints introduced earlier related to the compatibility with block size and position (conditions 161 and 162 of FIG. 16) and by the separation of the partitioning tree between luminance and chrominance. To take into account these constraints, for a given W×H chrominance PB whose top-left pixel is located at (x, y) in the current frame, if the luminance PB collocated with this chrominance PB is predicted by the neural network-based mode, DM becomes the neural network-based mode if (H,W)∈T and x≥$n_l$ and y≥$n_a$. Otherwise, DM is set to PLANAR.

In at least a first variant embodiment for signaling chrominance of a prediction block, a default value is selected when DM cannot be the neural network-based intra prediction mode. In this variant, for a given W×H chrominance PB whose top-left pixel is located at (x,y) in the current frame, if the luminance PB collocated with this chrominance PB is predicted by the neural network-based mode, but (H,W)∉T or x<$n_l$ or y<$n_a$, DM is set to a given mode in the list $L_c$ described in the description of FIG. 10.

Figure 24:
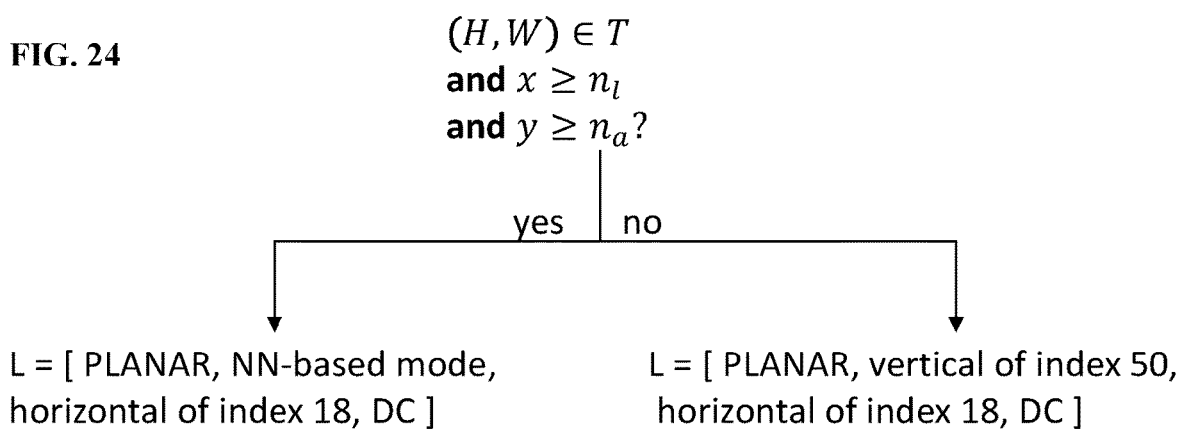
FIG. 24 illustrates an example decision for selecting modes for signaling chrominance of a prediction block according to a second variant embodiment.

FIG. 24 illustrates an example decision for selecting modes for signaling chrominance of a prediction block according to a second variant embodiment. In this embodiment, the neural network-based intra prediction mode is inserted into the $L_c$ list described in the description of FIG. 10. In this variant, for a given W×H chrominance PB whose top-left pixel is located at (x,y) in the current frame as illustrated in FIG. 15, if (H,W)∈T and x≥$n_1$ and y≥$n_a$, a given mode in the $L_c$ list defined earlier is replaced by the neural network-based mode. For instance, in FIG. 24, the given mode is the vertical mode of index 50.

The second variant for signaling chrominance of a prediction block may be combined with the first variant for signaling chrominance of a prediction block.

In at least one embodiment, the signaling of a neural network-based intra prediction mode of a prediction block with context pre-transformation. In this embodiment, there is still the set T⊆Q of pairs of a block height and width and, for each pair (H,W) in T, the neural network $f_{H,W}(.; \theta_{H,W})$ in the neural network-based mode predicts blocks of size W×H. But, now, context pre-transformations are developed such that blocks of size different from W×H can be predicted via $f_{H,W}(.; \theta_{H,W})$. Firstly, some down-sampling of the context of a block shown above and associated interpolations of the neural network prediction of this block are described below. Then, the transposition of the context and the neural network prediction are explained hereafter.

Figure 25A:
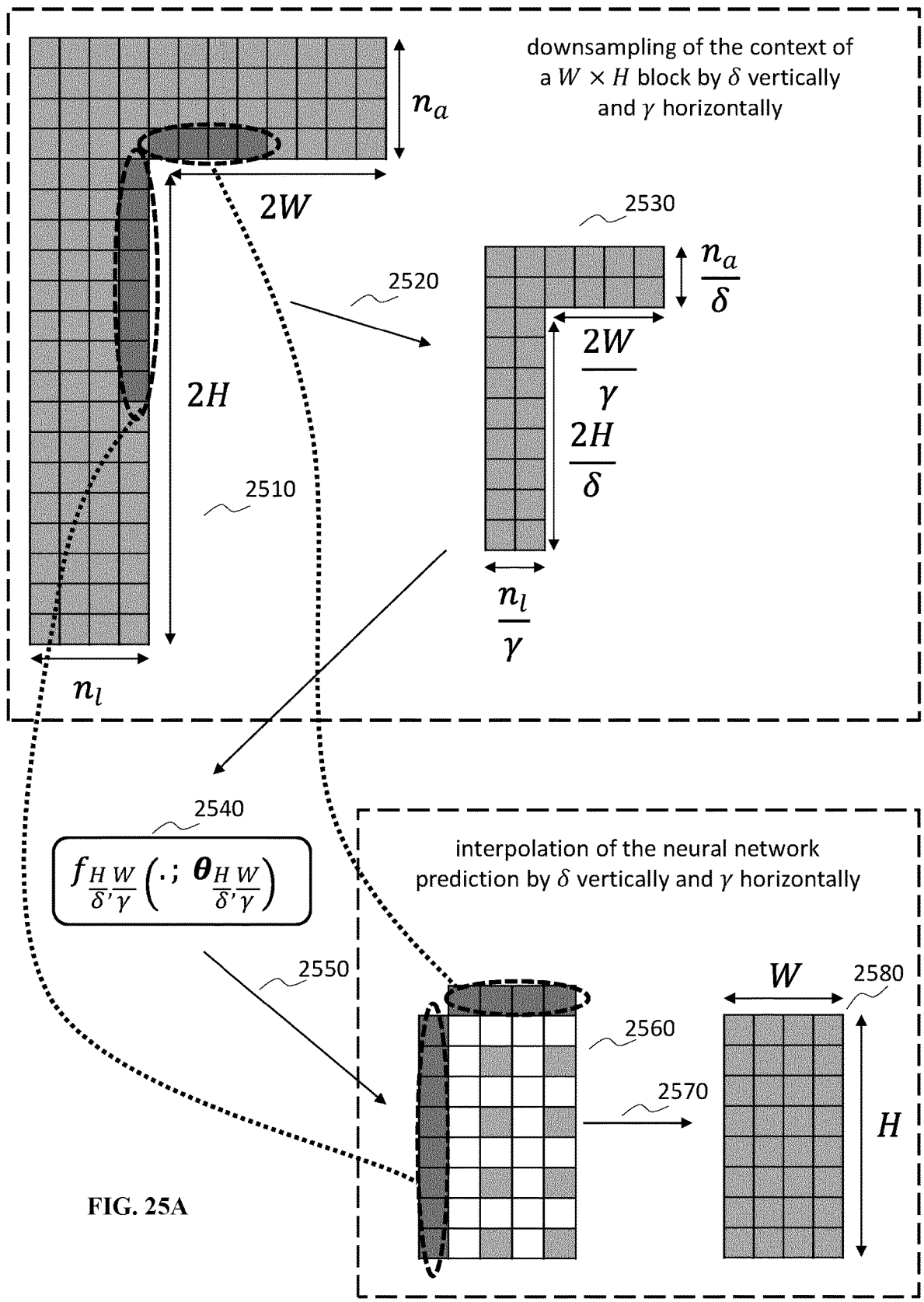
FIG. 25A illustrates an example of down-sampling of the context of a block and interpolation of the neural network prediction according to at least one embodiment.

FIG. 25A illustrates an example of down-sampling of the context of a block and interpolation of the neural network prediction according to at least one embodiment. A specificity of the down-sampling of the context X shown in FIG. 14 compared to the down-sampling of the reference samples in MIP lies in the fact that all the context portions must be down-sampled in the same manner along a given direction. For instance, if $X_0$ is down-sampled horizontally whereas $X_1$ is not down-sampled horizontally, discontinuities appear at the frontier between $X_0$ and $X_1$. This is damaging for the quality of the neural network prediction. Therefore, the prediction scheme via the neural network-based mode using the down-sampling of the context and the interpolation of the neural network prediction is displayed. In this figure, it is assumed that the pair (H,W)∉T whereas the pair $$\left(\frac{H}{\delta}, \frac{W}{\gamma}\right)$$

∈T, δ∈ℕ, γ∈ℕ*. In this case, for a given W×H block, using the down sampling of the context of this block by δ vertically and γ horizontally and the interpolation of the neural network prediction by δ vertically and γ horizontally, $$f_{\frac{H}{\delta},\frac{W}{\gamma}}\left(.;\theta_{\frac{H}{\delta},\frac{W}{\gamma}}\right)$$

can be used for prediction. Besides, $$f_{\frac{H}{\delta},\frac{W}{\gamma}}\left(.;\theta_{\frac{H}{\delta},\frac{W}{\gamma}}\right)$$

can predict blocks of size $$\frac{W}{\gamma} \times \frac{H}{\delta}$$

without any down-sampling and interpolation. Thus, $$f_{\frac{H}{\delta},\frac{W}{\gamma}}\left(.;\theta_{\frac{H}{\delta},\frac{W}{\gamma}}\right)$$

can be used to predict blocks of two different sizes. FIG. 25 shows down-sampling of the context of a W×H block and interpolation of the neural network prediction of size $$\frac{W}{\gamma} \times \frac{H}{\delta}$$

in order to use the neural network $$f_{\frac{H}{\delta},\frac{W}{\gamma}}\left(.;\theta_{\frac{H}{\delta},\frac{W}{\gamma}}\right)$$

for prediction. Here, H=8, W=4, Rule (1) is used, i.e. $n_a=n_l=\min(H,W)=4$. The vertical down-sampling factor δ is equal to 2 and the horizontal downsampling factor γ is equal to 2.

Figure 25B:
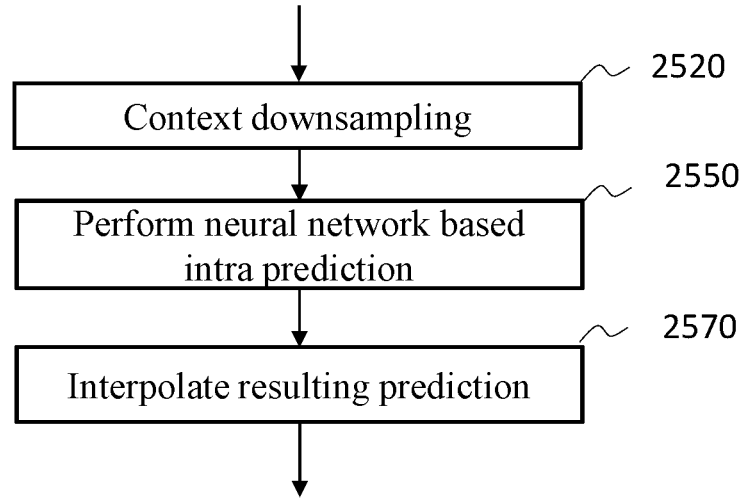
FIG. 25B illustrates an example of method for down-sampling of the context of a block and interpolating the neural network prediction according to at least one embodiment.

FIG. 25B illustrates an example of method for down-sampling of the context of a block and interpolating the neural network prediction according to at least one embodiment. The context (2510) is first down-sampled in step 2520. The neural network-based prediction is then applied using the down-sampled context (2530) in step 2550 and the resulting prediction (2560) is interpolated in step 2570.

In accordance with FIG. 25A, a new intra prediction mode signaling is proposed with the neural network-based intra prediction mode that incorporates the possibility of down-sampling the context of a luminance PB and interpolating the neural network prediction of this PB. In this signaling, (δ, γ)∈({1, 2, 4, ..., $2^p$})², p∈ℕ. The down-sampling of the context of a W×H luminance PB and the interpolation of the neural network prediction of this PB are considered only when min(H,W)≥4 since the above-mentioned down-sampling and interpolation make no sense for very small PBs. Moreover, the smallest values for δ and γ should be favored as the down-sampling of the context of this PB and the interpolation of the neural network prediction of this PB tend to decrease the quality of the neural network prediction. Thus, this new intra prediction mode signaling with the neural network-based mode is determined by Algorithm 1 hereunder, applied to an example implementation related to JEM/JEVT. The algorithm can be summarized as follows: search for $\delta$, $\gamma$, and the intra prediction mode signaling with the neural network-based mode for a W×H luminance PB whose top-left pixel is located at (x, y) in the current frame. If "isSignaling0" is true, the intra prediction mode signaling $\mathcal{S}_0$ is used. Otherwise, $\mathcal{S}_1$ is used. Note that this algorithm can apply to either the $\mathcal{S}_0$ and $\mathcal{S}_1$ in the intra prediction mode signaling of any of the embodiments proposed above in relation with FIGS. 18 to 22.

---
Algorithm 1
---
Inputs: H, W, x, and y
 $\delta = 1$
 $\gamma = 1$
  isSignaling0 = false
  if $x \geq n_l$ and $y \geq n_a$ then
   if min(H, W) < 4 then
    if (H, W) ∈ T then
     isSignaling0 = true
    end if
   else
    if (H, W) ∈ T then
     isSignaling0 = true
    else
     for all $i \in [\![1, \rho]\!]$ do
      $\gamma = 2^{i-1}$
      $\delta = 2^i$ if $\left(\dfrac{H}{\delta}, \dfrac{W}{\gamma}\right) \in T$ then isSignaling0 = true
       break
      else
       $\gamma = 2^i$
       $\delta = 2^{i-1}$ if $\left(\dfrac{H}{\delta}, \dfrac{W}{\gamma}\right) \in T$ then isSignaling0 = true
        break
       else
        $\gamma = 2^i$
        $\delta = 2^i$ if $\left(\dfrac{H}{\delta}, \dfrac{W}{\gamma}\right) \in T$ then isSignaling0 = true
         break
Outputs: $\delta$, $\gamma$, and "isSignaling0"
---

In Algorithm 1, any condition for ignoring the down-sampling of the context of a W×H luminance PB and the interpolation of the neural network prediction of this PB can be chosen. For instance, min(H,W)<4 can be replaced by min(H,W)<8. Then, Algorithm 1 becomes Algorithm 2.

---
Algorithm 2
---
Inputs: H, W, x, and y
 $\delta = 1$
 $\gamma = 1$
  isSignaling0 = false
  if $x \geq n_l$ and $y \geq n_a$ then ---
Algorithm 2
---
   if min(H, W) < 8 then
    if (H, W) ∈ T then
     isSignaling0 = true
    end if
   else
    if (H, W) ∈ T then
     isSignaling0 = true
    else
     for all $i \in [\![1, \rho]\!]$ do
      $\gamma = 2^{i-1}$
      $\delta = 2^i$ if $\left(\dfrac{H}{\delta}, \dfrac{W}{\gamma}\right) \in T$ then isSignaling0 = true
       break
      else
       $\gamma = 2^i$
       $\delta = 2^{i-1}$ if $\left(\dfrac{H}{\delta}, \dfrac{W}{\gamma}\right) \in T$ then isSignaling0 = true
        break
       else
        $\gamma = 2^i$
        $\delta = 2^i$ if $\left(\dfrac{H}{\delta}, \dfrac{W}{\gamma}\right) \in T$ then isSignaling0 = true
         break
Outputs: $\delta$, $\gamma$, and "isSignaling0"
---

In Algorithm 2, in the loop increasing the horizontal down-sampling factor and the horizontal down-sampling factor iteratively, the vertical down sampling factor grows before to the horizontal one. Alternatively, the order of increase can be inverted. Then, Algorithm 1 is turned into Algorithm 3.

---
Algorithm 3
---
Inputs: H, W, x, and y
 $\delta = 1$
 $\gamma = 1$
  isSignaling0 = false
  if $x \geq n_l$ and $y \geq n_a$ then
   if min(H, W) < 4 then
    if (H, W) ∈ T then
     isSignaling0 = true
    end if
   else
    if (H, W) ∈ T then
     isSignaling0 = true
    else
     for all $i \in [\![1, \rho]\!]$ do
      $\gamma = 2^i$
      $\delta = 2^{i-1}$ if $\left(\dfrac{H}{\delta}, \dfrac{W}{\gamma}\right) \in T$ then isSignaling0 = true
       break
      else
       $\gamma = 2^{i-1}$
       $\delta = 2^i$

Algorithm 3 if $\left(\frac{H}{\delta}, \frac{W}{\gamma}\right) \in T$ then isSignaling0 = true
    break
else
    $\gamma = 2^i$
    $\delta = 2^i$ if $\left(\frac{H}{\delta}, \frac{W}{\gamma}\right) \in T$ then isSignaling0 = true
        break
Outputs: $\delta$, $\gamma$, and "isSignaling0"

FIG. 26 illustrates an example of mapping from the size W×H of the current luminance PB to $\gamma$, $\delta$, the intra prediction mode signaling, and the neural network used for prediction. Rule (2) with $$a = \beta = \frac{3}{4}$$

applies. $\mathcal{S}_0$ and $\mathcal{S}_1$ are depicted in FIG. 18. T={(4, 4), (8, 8), (16, 16), (32, 32), (4, 8), (8, 4)}. Algorithm 1 applies with $\rho=1$. The figure shows the mapping from each size of luminance PB to $\gamma$, $\delta$, the intra prediction mode signaling, and the neural network in the neural network-based mode used for prediction. In this figure, $\gamma$, $\delta$, and the neural network are not written when the intra prediction mode signaling is $\mathcal{S}_1$ as they are useless. Moreover, it is assumed that the current luminance PB is far enough from the image bounds such that its context never goes out of bounds.

In at least one embodiment, the signaling in Algorithm 1 extends to a chrominance PB with the difference that the returned boolean "isSignaling0" is interpreted differently. Indeed, for a given W×H chrominance PB whose top-left pixel is located at (x,y) in the current frame, if the luminance PB collocated with this chrominance PB is predicted by the neural network-based mode, DM becomes the neural network-based mode if "isSignaling0" is true. Otherwise, DM is set to PLANAR. Note that the first and second variants proposed above can apply here too.

In at least one variant embodiment, another default value is used when DM cannot be the neural network-based mode. In this embodiment, for a given W×H chrominance PB whose top-left pixel is located at (x,y) in the current frame, if the luminance PB collocated with this chrominance PB is predicted by the neural network-based mode, DM becomes the neural network-based mode if "isSignaling0" is true. Otherwise, DM is set to a given mode in the $L_c$ list.

In at least one variant embodiment, the neural network-based intra prediction mode is inserted into the $L_c$ list. In this embodiment, for a given W×H chrominance PB whose top-left pixel is located at (x,y) in the current frame, if "isSignaling0" is true, a given mode in the $L_c$ list is replaced by the neural network-based intra prediction mode.

Figure 27B:
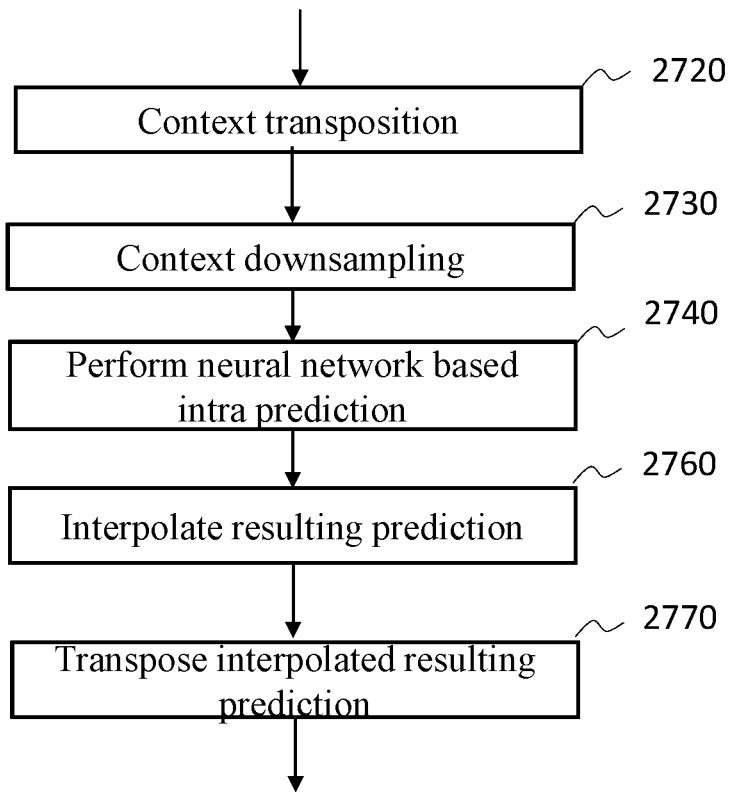
FIG. 27B illustrates an example of method for transposition of the context of a block and transposition of the interpolated neural network prediction in order to use the neural network based intra prediction mode.
Figure 27A:
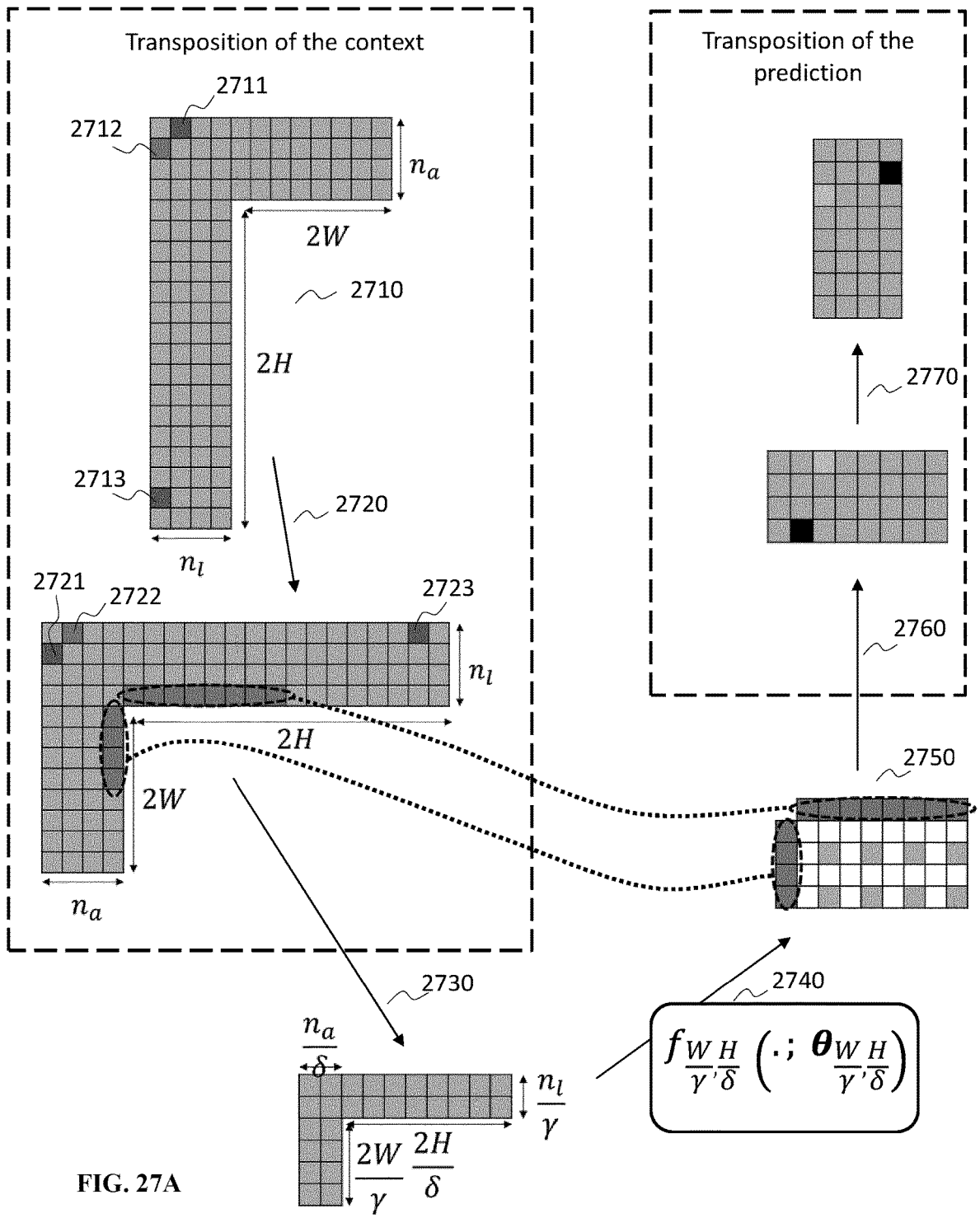
FIG. 27A illustrates an example of transposition of the context of a block and transposition of the interpolated neural network prediction in order to use the neural network based intra prediction mode.

FIG. 27A illustrates an example of transposition of the context of a block and transposition of the interpolated neural network prediction in order to use the neural network-based intra prediction mode. Indeed, another way to predict blocks of several sizes via the same neural network in the neural network-based mode consists in transposing the context of a given block and transposing the neural network prediction. The prediction scheme via the neural network-based mode using the transposition of the context, the down-sampling of the resulting transposed context, the interpolation of the neural network prediction, and the transposition of the resulting interpolated prediction is shown in FIG. 27. More particularly, the figure shows the transposition of the context of a W×H block and transposition of the interpolated neural network prediction of size H×W in order to use the neural network $$f_{\frac{H}{\delta}, \frac{W}{\gamma}}\left(\cdot\,;\,\theta_{\frac{H}{\delta}, \frac{W}{\gamma}}\right)$$

for prediction. Here, H=8, W=4, Rule (1) is used, i.e. $n_a = n_l = \min(H,W) = 4$. The vertical downsampling factor $\delta$ is equal to 2 and the horizontal downsampling factor $\gamma$ is equal to 2. It is assumed that the pair $(H,W) \notin T$, the pair $(W, H) \notin T$, the pair $$\left(\frac{H}{\delta}, \frac{W}{\gamma}\right)$$

$\notin T$ whereas the pair $$\left(\frac{W}{\gamma}, \frac{H}{\delta}\right)$$

$\in T$.

FIG. 27B illustrates an example of method for transposition of the context of a block and transposition of the interpolated neural network prediction in order to use the neural network based intra prediction mode. In this figure, the context (2710) of the block is transposed in step 2720 before the down-sampling step 2730. Then, the neural network intra prediction is performed in step 2740 and the resulting prediction (2750) is interpolated in step 2760, then the result of the interpolation is transposed in step 2770.

Alternatively, the context of the block can be down-sampled before transposing the result of the down-sampling. Then, the neural network prediction can be transposed before interpolating the transposed prediction.

The transposition of context results in a transposed shape where the samples 2711, 2712, 2713 are respectively transposed into the samples 2721, 2722, 2723.

When the above-mentioned transposition process into the intra prediction mode signaling as described above with the neural network-based mode for the current luminance PB, Algorithm 1 becomes Algorithm 4.

Algorithm 4

Inputs: H, W, x, and y
    $\delta = 1$
    $\gamma = 1$
    isSignaling0 = false
    isTransposed = false
    if $x \geq n_l$ and $y \geq n_a$ then
        if min(H, W) < 4 then
            if (H, W) $\in$ T then
                isSignaling0 = true
            else if (W, H) $\in$ T then -continued Algorithm 4

```
        isSignaling0 = true
        isTransposed = true
    end if
else
    if (H, W) ∈ T then
        isSignaling0 = true
    else if (W, H) ∈ T then
        isSignaling0 = true
        isTransposed = true
    else
        for all i ∈ ⟦1, ρ⟧ do
            γ = 2^{i-1}
            δ = 2^i if (H/δ, W/γ) ∈ T then isSignaling0 = true
                break else if (W/γ, H/δ) ∈ T then isSignaling0 = true
                isTransposed = true
                break
            else
                γ = 2^i
                δ = 2^{i-1} if (H/δ, W/γ) ∈ T then isSignaling0 = true
                    break else if (W/γ, H/δ) ∈ T then isSignaling0 = true
                    isTransposed = true
                    break
                else
                    γ = 2^i
                    δ = 2^i if (H/δ, W/γ) ∈ T then isSignaling0 = true
                        break else if (W/γ, H/δ) ∈ T then isSignaling0 = true
                        isTransposed = true
                        break
Outputs: δ, γ, "isSignaling0", and "isTransposed"
```

In a variant embodiment of algorithm 4, any condition for ignoring the down-sampling of the context of a W×H luminance PB and the interpolation of the neural network prediction of this PB can be chosen.

In Algorithm 4, in the loop increasing the horizontal down-sampling factor and the horizontal down-sampling factor iteratively, the vertical down-sampling factor grows before the horizontal one. Alternatively, the order of increase can be inverted. Then, Algorithm 4 becomes Algorithm 5.

Algorithm 5

```
Inputs: H, W, x, and y
    δ = 1
    γ = 1
    isSignaling0 = false
    isTransposed = false
    if x ≥ n_l and y ≥ n_a then
        if min(H, W) < 4 then
            if (H, W) ∈ T then
                isSignaling0 = true
            else if (W, H) ∈ T then
                isSignaling0 = true
                isTransposed = true
            end if
        else
            if (H, W) ∈ T then
                isSignaling0 = true
            else if (W, H) ∈ T then
                isSignaling0 = true
                isTransposed = true
            else
                for all i ∈ ⟦1, ρ⟧ do
                    γ = 2^i
                    δ = 2^{i-1} if (H/δ, W/γ) ∈ T then isSignaling0 = true
                        break else if (W/γ, H/δ) ∈ T then isSignaling0 = true
                        isTransposed = true
                        break
                    else
                        γ = 2^{i-1}
                        δ = 2^i if (H/δ, W/γ) ∈ T then isSignaling0 = true
                            break else if (W/γ, H/δ) ∈ T then isSignaling0 = true
                            isTransposed = true
                            break
                        else
                            γ = 2^i
                            δ = 2^i if (H/δ, W/γ) ∈ T then isSignaling0 = true
                                break else if (W/γ, H/δ) ∈ T then isSignaling0 = true
                                isTransposed = true
                                break
Outputs: δ, γ, "isSignaling0", and "isTransposed"
```

The signaling in Algorithm 5 extends to a chrominance PB. However, the returned boolean "isSignaling0" is interpreted differently. For a given W×H chrominance PB whose top-left pixel is located at (x,y) in the current frame, if the luminance PB collocated with this chrominance PB is predicted by the neural network-based mode, DM becomes the neural network-based mode if "isSignaling0" is true. Otherwise, DM is set to PLANAR.

The two variants for chrominance signaling described above in relation with algorithm 1 apply here also in Algorithm 5.

As explained in the description of FIG. 8, for the current luminance CB, the list of MPMs implements the signaling of the selected intra prediction mode via entropy coding. But, when the neural network-based intra prediction is integrated into the intra prediction mode signaling, the list of MPMs in H.266 no longer implements a "quasi-optimal" entropy coding. This is especially valid in the cases of FIGS. 18 to 22, i.e. when, in $\mathcal{S}_0$, the flag nnFlag is placed towards the beginning of the decision tree representing the intra prediction mode signaling for the current luminance CB. Indeed, in the cases of FIGS. 18 to 22, it is observed that the frequency of selection of PLANAR drops very significantly compared to the frequency of selection of PLANAR in H.266.

To correct this entropy coding, in a first embodiment, if the intra prediction mode signaling $\mathcal{S}_0$ including the flag nnFlag specific to the neural network-based intra prediction mode is picked, see the description of FIG. 15, the MPM list is modified such that the index of PLANAR in the MPM list is increased. Otherwise, another intra prediction mode signaling $\mathcal{S}_1$ which does not include nnFlag applies, and the index of PLANAR in the MPM list is 0. Note that, in Table 1, the flag indicating whether the MPM of index 0 is selected to predict the current luminance CB has a context model. But, in this first embodiment, PLANAR is not systematically the MPM of index 0. Therefore, in this first embodiment, the context model of the flag indicating whether the MPM of index 0 is selected to predict the current luminance CB can be removed.

In at least one variant of the first embodiment, if the intra prediction mode signaling $\mathcal{S}_0$ including the flag nnFlag is picked, the derivation of the MPM list is conducted such that the index of PLANAR in the MPM list is either 2 or 3 when the initialized values are not used, as shown in Algorithm 6. Otherwise, another intra prediction mode signaling $\mathcal{S}_1$ which does not include nnFlag applies, and the index of PLANAR in the MPM list is 0, see Algorithm 6. Note that Algorithm 6 contains several conditions on multiRefIdx which always place PLANAR as the MPM of index 0 if multiRefIdx>0. This is because, if multiRefIdx>0, PLANAR, which is the MPM of index 0, is ignored. In this case, only the MPMs of indices 1 to 5 are considered as illustrated in Table 2.

---

Algorithm 6: derivation of the MPM list in the first variant of the first embodiment.

---

NN_IDX is the index of the neural network-based intra prediction mode, e.g. 72. If "isSignaling0" is true, the intra prediction mode signaling $\mathcal{S}_0$ including the flag nnFlag is used. Otherwise, $\mathcal{S}_1$ is used.

```
L = intra mode of the left CU whose index belongs to ⟦0, 66⟧ ∪ {NN_IDX}
A = intra mode of the above CU whose index value belongs to ⟦0, 66⟧ ∪ {NN_IDX}
offset = 61
mod = 64
Initialization of the MPM list:
      MPM[0] = PLANAR_IDX
      MPM[1] = DC_IDX
      MPM[2] = VER_IDX
      MPM[3] = HOR_IDX
      MPM[4] = VER_IDX - 4
      MPM[5] = VER_IDX + 4
if(L == A)
    if ((L > DC_IDX) && (L != NN_IDX))
        if((multiRefIdx > 0) || !isSignaling0)
            MPM[0] = PLANAR_IDX
            MPM[1] = L
            MPM[2] = ((L + offset) % mod) + 2
            MPM[3] = ((L - 1) % mod) + 2
            MPM[4] = ((L + offset - 1) % mod) + 2
            MPM[5] = (L % mod) + 2
        else
            MPM[0] = L
            MPM[1] = ((L + offset) % mod) + 2
            MPM[2] = ((L - 1) % mod) + 2
            MPM[3] = PLANAR_IDX
            MPM[4] = ((L + offset - 1) % mod) + 2
            MPM[5] = (L % mod) + 2
    else
        use initialized values
else
    if ((L == NN_IDX) || (A == NN_IDX))
        if((L == NN_IDX) && (A > DC_IDX))
            if(multiRefIdx > 0 || !isSignaling0)
                MPM[0] = PLANAR_IDX
                MPM[1] = A
                MPM[2] = ((A + offset) % mod) + 2
                MPM[3] = ((A - 1) % mod) + 2
                MPM[4] = ((A + offset - 1) % mod) + 2
                MPM[5] = (A % mod) + 2
            else
                MPM[0] = A
                MPM[1] = ((A + offset) % mod) + 2
                MPM[2] = ((A - 1) % mod) + 2
                MPM[3] = PLANAR_IDX
```

Algorithm 6: derivation of the MPM list in the first variant of the first embodiment.

```
            MPM[4] = ((A + offset − 1) % mod) + 2
            MPM[5] = (A % mod) + 2
         else if ((A == NN_IDX) && (L > DC_IDX))
            if(multiRefIdx > 0 || !isSignaling0)
               MPM[0] = PLANAR_IDX
               MPM[1] = L
               MPM[2] = ((L + offset) % mod) + 2
               MPM[3] = ((L − 1) % mod) + 2
               MPM[4] = ((L + offset − 1) % mod) + 2
               MPM[5] = (L % mod) + 2
            else
               MPM[0] = L
               MPM[1] = ((L + offset) % mod) + 2
               MPM[2] = ((L − 1) % mod) + 2
               MPM[3] = PLANAR_IDX
               MPM[4] = ((L + offset − 1) % mod) + 2
               MPM[5] = (L % mod) + 2
         else
            use initialized values
   else
      if ((L > DC_IDX) && (A > DC_IDX))
         if(multiRefIdx > 0 || !isSignaling0)
            MPM[0] = PLANAR_IDX
            MPM[1] = L
            MPM[2] = A
         else
            MPM[0] = L
            MPM[1] = A
            MPM[2] = PLANAR_IDX
```

$$MPM[3] = \begin{cases} ((\min(L, A) + \text{offset}) \% \text{ mod}) + 2 & \text{if } (*) \\ ((\min(L, A) - 1) \% \text{ mod}) + 2 & \text{if } () \\ ((\min(L, A) - 1) \% \text{ mod}) + 2 & \text{if } (*) \\ ((\min(L, A) + \text{offset}) \% \text{ mod}) + 2 & \text{if } (****) \end{cases}$$

$$MPM[4] = \begin{cases} ((\max(L, A) - 1) \% \text{ mod}) + 2 & \text{if } (*) \\ ((\max(L, A) + \text{offset}) \% \text{ mod}) + 2 & \text{if } () \\ ((\max(L, A) + \text{offset}) \% \text{ mod}) + 2 & \text{if } (*) \\ ((\max(L, A) - 1) \% \text{ mod}) + 22 & \text{if } (****) \end{cases}$$

$$MPM[5] = \begin{cases} ((\min(L, A) + \text{offset}-1) \% \text{ mod}) + 2 & \text{if } (*) \\ (\min(L, A) \% \text{ mod}) + 2 & \text{if } () \\ ((\max(L, A) - 1) \% \text{ mod}) + 2 & \text{if } (*) \\ ((\max(L, A) + \text{offset}) \% \text{ mod}) + 2 & \text{if } (****) \end{cases}$$

```
      else if (L + A >= 2)
         if(multiRefIdx > 0 || !isSignaling0)
            MPM[0] = PLANAR_IDX
            MPM[1] = max(L, A)
            MPM[2] = ((max(L, A) + offset) % mod) + 2
            MPM[3] = ((max(L,A) − 1) % mod) + 2
            MPM[4] = ((max(L, A) + offset − 1) % mod) + 2
            MPM[5] = (max(L, A) % mod) + 2
         else
            MPM[0] = max(L, A)
            MPM[1] = ((max(L, A) + offset) % mod) + 2
            MPM[2] = ((max(L,A) − 1) % mod) + 2
            MPM[3] = PLANAR_IDX
            MPM[4] = ((max(L, A) + offset − 1) % mod) + 2
            MPM[5] = (max(L, A) % mod) + 2
         else
            use initialized values
with
   (*)    max(L, A) − min(L, A) == 1
   (**)   max(L, A) − min(L, A) >= 62
   (***)  max(L, A) − min(L, A) == 2
   (****) all other cases
```

In another variant of the first embodiment, if the intra prediction mode signaling $S_0$ including the flag nnFlag is picked, the derivation of the MPM list is conducted such that the index of PLANAR in the MPM list is 5 when the initialized values are not used, as shown in Algorithm 7. Otherwise, another intra prediction mode signaling $S_1$ which does not include nnFlag applies, and the index of PLANAR in the MPM list is 0, see Algorithm 7. For the reason explained in the first variant of the first embodiment, Algorithm 7 contains several conditions on multiRefIdx which always place PLANAR as the MPM of index 0 if multiRefIdx>0.

Algorithm 7: derivation of the MPM list in the first variant of the first embodiment.

NN_IDX is the index of the neural network-based intra prediction mode, e.g. 72. If "isSignaling0" is true, the intra prediction mode signaling $S_0$ including the flag nnFlag is used. Otherwise, $S_{-1}$ is used.

```
L ≡ intra mode of the left CU whose index belongs to 〚0, 66〛 ∪ {NN_IDX}
A ≡ intra mode of the above CU whose index value belongs to 〚0, 66〛 ∪ {NN_IDX}
offset = 61
mod = 64
Initialization of the MPM list:
    MPM[0] = PLANAR_IDX
    MPM[1] = DC_IDX
    MPM[2] = VER_IDX
    MPM[3] = HOR_IDX
    MPM[4] = VER_IDX − 4
    MPM[5] = VER_IDX + 4
if(L == A)
    if ((L > DC_IDX) && (L != NN_IDX))
        if((multiRefIdx > 0) || !isSignaling0)
            MPM[0] = PLANAR_IDX
            MPM[1] = L
            MPM[2] = ((L + offset) % mod) + 2
            MPM[3] = ((L − 1) % mod) + 2
            MPM[4] = ((L + offset − 1) % mod) + 2
            MPM[5] = (L % mod) + 2
        else
            MPM[0] = L
            MPM[1] = ((L + offset) % mod) + 2
            MPM[2] = ((L − 1) % mod) + 2
            MPM[3] = ((L + offset − 1) % mod) + 2
            MPM[4] = (L % mod) + 2
            MPM[5] = PLANAR_IDX
    else
        use initialized values
else
    if ((L == NN_IDX) || (A == NN_IDX))
        if((L == NN_IDX) && (A > DC_IDX))
            if(multiRefIdx > 0 || !isSignaling0)
                MPM[0] = PLANAR_IDX
                MPM[1] = A
                MPM[2] = ((A + offset) % mod) + 2
                MPM[3] = ((A − 1) % mod) + 2
                MPM[4] = ((A + offset − 1) % mod) + 2
                MPM[5] = (A % mod) + 2
            else
                MPM[0] = A
                MPM[1] = ((A + offset) % mod) + 2
                MPM[2] = ((A − 1) % mod) + 2
                MPM[3] = ((A + offset − 1) % mod) + 2
                MPM[4] = (A % mod) + 2
                MPM[5] = PLANAR_IDX
        else if ((A == NN_IDX) && (L > DC_IDX))
            if(multiRefIdx > 0 || !isSignaling0)
                MPM[0] = PLANAR_IDX
                MPM[1] = L
                MPM[2] = ((L + offset) % mod) + 2
                MPM[3] = ((L − 1) % mod) + 2
                MPM[4] = ((L + offset − 1) % mod) + 2
                MPM[5] = (L % mod) + 2
            else
                MPM[0] = L
                MPM[1] = ((L + offset) % mod) + 2
                MPM[2] = ((L − 1) % mod) + 2
                MPM[3] = ((L + offset − 1) % mod) + 2
                MPM[4] = (L % mod) + 2
                MPM[5] = PLANAR_IDX
        else
            use initialized values
    else
        if ((L > DC_IDX) && (A > DC_IDX))
            idxIncrem = 0
            if(multiRefIdx > 0 || !isSignaling0)
                MPM[0] = PLANAR_IDX
                MPM[1] = L
                MPM[2] = A
                idxIncrem = 3
```

Algorithm 7: derivation of the MPM list in the first variant of the first embodiment.

```
    else
        MPM[0] = L
        MPM[1] = A
        MPM[2] = PLANAR_IDX
        idxIncrem = 2
```

$$MPM[idxIncrem++] = \begin{cases} ((\min(L, A) + \text{offset}) \% \text{ mod}) + 2 \text{ if } (*) \\ ((\min(L, A) - 1) \% \text{ mod}) + 2 \text{ if } () \\ ((\min(L, A) - 1) \% \text{ mod}) + 2 \text{ if } (*) \\ ((\min(L, A) + \text{offset}) \% \text{ mod}) + 2 \text{ if } (****) \end{cases}$$

$$MPM[idxIncrem++] = \begin{cases} ((\max(L, A) - 1) \% \text{ mod}) + 2 \text{ if } (*) \\ ((\max(L, A) + \text{offset}) \% \text{ mod}) + 2 \text{ if } () \\ ((\max(L, A) + \text{offset}) \% \text{ mod}) + 2 \text{ if } (*) \\ ((\max(L, A) - 1) \% \text{ mod}) + 22 \text{ if } (****) \end{cases}$$

$$MPM[idxIncrem++] = \begin{cases} ((\min(L, A) + \text{offset}-1) \% \text{ mod}) + 2 \text{ if } (*) \\ (\min(L, A) \% \text{ mod}) + 2 \text{ if } () \\ ((\max(L, A) - 1) \% \text{ mod}) + 2 \text{ if } (*) \\ ((\max(L, A) + \text{offset}) \% \text{ mod}) + 2 \text{ if } (****) \end{cases}$$

```
    else if (L + A >= 2)
        if(multiRefIdx > 0 || !isSignaling0)
            MPM[0] = PLANAR_IDX
            MPM[1] = max(L, A)
            MPM[2] = ((max(L, A) + offset) % mod) + 2
            MPM[3] = ((max(L,A) - 1) % mod) + 2
            MPM[4] = ((max(L, A) + offset - 1) % mod) + 2
            MPM[5] = (max(L, A) % mod) + 2
        else
            MPM[0] = max(L, A)
            MPM[1] = ((max(L, A) + offset) % mod) + 2
            MPM[2] = ((max(L,A) - 1) % mod) + 2
            MPM[3] = ((max(L, A) + offset - 1) % mod) + 2
            MPM[4] = (max(L, A) % mod) + 2
            MPM[5] = PLANAR_IDX
    else
        use initialized values
with
    (*) max(L, A) - min(L, A) == 1
    (**) max(L, A) - min(L, A) >= 62
    (***) max(L, A) - min(L, A) == 2
    (****) all other cases
```

In a second embodiment, regardless whether the intra prediction mode signaling $S_0$ including the flag nnFlag specific to the neural network-based intra prediction mode or another intra prediction mode signaling $S_1$ which does not include nnFlag, is chosen, the MPM list is modified such that the index of PLANAR in the MPM list is increased.

In at least one variant of the second embodiment, the derivation of the MPM list is conducted as illustrated in Algorithm 6, but removing all terms '||!isSignaling0'.

In another variant of the second embodiment, the derivation of the MPM list is conducted as depicted in Algorithm 7, but removing all terms '||!isSignaling0'.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory or optical media storage). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A video encoding method comprising:
    performing intra prediction for at least one block in a picture or video using a neural network based intra prediction by feeding a block context into a neural network selected based on a size of the at least one block, the block context comprising pixels of blocks located at a top side, at a left side, at a diagonal top left side, at a diagonal top right side and at a diagonal bottom left side of the at least one block, wherein the size of the block context is based on the size of the at least one block, and wherein the block context comprises $n_l$ columns and $n_a$ rows, wherein $n_l$ and $n_a$ are selected as:

$$n_a = \alpha H, n_l = \beta W, \alpha \in \left[\frac{1}{4}, \frac{1}{2}, \frac{3}{4}, 1, 2\right], \beta \in \left[\frac{1}{4}, \frac{1}{2}, \frac{3}{4}, 1, 2\right]$$

where H is a height of the block and W is a width of the block;
    generating signaling information representative that the intra prediction mode is a neural network based intra prediction; and
    encoding at least information representative of the at least one block and the neural network-based intra prediction mode.

2. The method of claim 1, wherein the signaling information is encoded in a bitstream and comprises a flag indicating that a neural network-based intra prediction mode is selected for the at least one block, the flag being based on a set of flags representing a plurality of intra prediction modes arranged in a binary tree for being encoded in a bitstream and wherein the flag indicating that neural network-based intra prediction mode is selected is located at a first level of the tree and encoded with a single bit.

3. A video decoding method comprising:
    obtaining, for at least one block in a picture or video, at least information representative that an intra prediction is a neural network-based prediction and a block context, the block context comprising pixels of blocks located at a top side, at a left side, at a diagonal top left side, at a diagonal top right side and at a diagonal bottom left side of the at least one block, wherein the size of the block context is based on the size of the at least one block, and wherein the block context comprises $n_l$ columns and $n_a$ rows, wherein $n_l$ and $n_a$ are selected as:

$$n_a = \alpha H, n_l = \beta W, \alpha \in \left[\frac{1}{4}, \frac{1}{2}, \frac{3}{4}, 1, 2\right], \beta \in \left[\frac{1}{4}, \frac{1}{2}, \frac{3}{4}, 1, 2\right]$$

where H is a height of the block and W is a width of the block; and
    performing intra prediction for the at least one block in a picture or video by feeding the block context into a neural network based on the size of the at least one block.

4. The method of claim 3, wherein the neural network-based intra prediction is performed based on a position of the at least one block.

5. The method of claim 3, wherein the block context is down-sampled prior to performing the intra prediction and the at least one predicted block resulting from the neural network based intra prediction is interpolated after the intra prediction.

6. The method of claim 3, wherein the block context is transposed prior to performing the intra prediction and the at least one predicted block resulting from the neural network based intra prediction is transposed back after the intra prediction.

7. The method of claim 3, wherein the block context is down-sampled and transposed prior to performing the intra prediction and the at least one predicted block resulting from the neural network based intra prediction is transposed back and interpolated after the intra prediction.

8. The method of claim 3, wherein the neural network-based intra prediction is done in both luminance and chrominance of the at least one block.

9. An apparatus, comprising an encoder for encoding a current block in a picture or video wherein the encoder is configured to:
    perform intra prediction for at least one block in a picture or video using a neural network based intra prediction by feeding a block context into a neural network selected based on a size of the at least one block, the block context comprising pixels of blocks located at a top side, at a left side, at a diagonal top left side, at a diagonal top right side and at a diagonal bottom left side of the at least one block, wherein the size of the block context is based on the size of the at least one block, and wherein the block context comprises $n_l$ columns and $n_a$ rows, wherein $n_l$ and $n_a$ are selected as:

$$n_a = \alpha H, n_l = \beta W, \alpha \in \left[\frac{1}{4}, \frac{1}{2}, \frac{3}{4}, 1, 2\right], \beta \in \left[\frac{1}{4}, \frac{1}{2}, \frac{3}{4}, 1, 2\right]$$

where H is a height of the block and W is a width of the block;

generate signaling information representative that the intra prediction mode is a neural network based intra prediction; and encode at least information representative of the at least one block and the neural network-based intra prediction mode.

10. An apparatus, comprising a decoder for decoding picture data for a current block in a picture or video wherein the decoder is configured to:

obtain, for at least one block in a picture or video, at least information representative that an intra prediction is a neural network-based prediction and a block context, the block context comprising pixels of blocks located at a top side, at a left side, at a diagonal top left side, at a diagonal top right side and at a diagonal bottom left side of the at least one block, wherein the size of the block context is based on the size of the at least one block, and wherein the block context comprises $n_l$ columns and $n_a$ rows, wherein $n_l$ and $n_a$ are selected as:

$$n_a = \alpha H, n_l = \beta W, \alpha \in \left[\left[\frac{1}{4}, \frac{1}{2}, \frac{3}{4}, 1, 2\right]\right], \beta \in \left[\left[\frac{1}{4}, \frac{1}{2}, \frac{3}{4}, 1, 2\right]\right]$$

where H is a height of the block and W is a width of the block; and perform intra prediction for the at least one block in a picture or video by feeding the block context into a neural network selected based on the size of the at least one block.

11. The apparatus of claim 10, wherein the neural network-based intra prediction is performed based on a position of the at least one block.

12. The apparatus of claim 10, wherein the block context is down-sampled prior to performing the intra prediction and the at least one predicted block resulting from the neural network-based intra prediction is interpolated after the intra prediction.

13. The apparatus of claim 10, wherein the block context is transposed prior to performing the intra prediction and the at least one predicted block resulting from the neural network-based intra prediction is transposed back after the intra prediction.

14. The apparatus of claim 10, wherein the block context is down-sampled and transposed prior to performing the intra prediction and the at least one predicted block resulting from the neural network-based intra prediction is transposed back and interpolated after the intra prediction.

15. A non-transitory computer readable medium comprising program code instructions for implementing the steps of a method according to claim 3 when executed by a processor.

16. The method of claim 1, wherein the neural network is selected among a set of at least two neural networks, and wherein at least one size of a block is associated to each neural network of the set of at least two neural networks.

17. The method of claim 3, wherein the neural network is selected among a set of at least two neural networks, and wherein at least one size of a block is associated to each neural network of the set of at least two neural networks.

18. The apparatus of claim 9, wherein the signaling information is encoded in a bitstream and comprises a flag indicating that a neural network-based intra prediction mode is selected for the at least one block, the flag being based on a set of flags representing a plurality of intra prediction modes arranged in a binary tree for being encoded in a bitstream and wherein the flag indicating that neural network-based intra prediction mode is selected is located at a first level of the tree and encoded with a single bit.

19. The apparatus of claim 9, wherein the neural network is selected among a set of at least two neural networks, and wherein at least one size of a block is associated to each neural network of the set of at least two neural networks.

20. The apparatus of claim 10, wherein the neural network is selected among a set of at least two neural networks, and wherein at least one size of a block is associated to each neural network of the set of at least two neural networks.

* * * * *